US012412331B2

(12) United States Patent
Du et al.

(10) Patent No.: US 12,412,331 B2
(45) Date of Patent: Sep. 9, 2025

(54) METHODS AND APPARATUS FOR SELECTION OF RENDERING MODES

(71) Applicant: QUALCOMM Incorporated, San Diego, CA (US)

(72) Inventors: Bo Du, Xi'an (CN); Andrew Evan Gruber, Arlington, MA (US); Yongjun Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 130 days.

(21) Appl. No.: 18/245,881

(22) PCT Filed: Nov. 19, 2020

(86) PCT No.: PCT/CN2020/130048
§ 371 (c)(1),
(2) Date: Mar. 17, 2023

(87) PCT Pub. No.: WO2022/104635
PCT Pub. Date: May 27, 2022

(65) Prior Publication Data
US 2024/0013336 A1    Jan. 11, 2024

(30) Foreign Application Priority Data
Nov. 18, 2020   (WO) ................ PCT/CN2020/129706

(51) Int. Cl.
| | | |
|---|---|---|
| *G06T 15/00* | (2011.01) | |
| *G06T 1/20* | (2006.01) | |
| *G06T 1/60* | (2006.01) | |

(52) U.S. Cl.
CPC .............. *G06T 15/005* (2013.01); *G06T 1/20* (2013.01); *G06T 1/60* (2013.01)

(58) Field of Classification Search
CPC .......... G06T 15/005; G06T 1/20; G06T 1/60; G06T 15/04; G06T 15/40; G06T 15/503; G06T 11/40; G06T 2200/28
See application file for complete search history.

(56) References Cited

U.S. PATENT DOCUMENTS 5,977,977 A * 11/1999 Kajiya .................... G06T 11/40
345/418
6,574,360 B1 * 6/2003 Berdardini .............. G06T 15/40
382/285

(Continued)

FOREIGN PATENT DOCUMENTS

| CN | 108305318 A | 7/2018 |
|---|---|---|
| CN | 110874811 A | 3/2020 |

(Continued)

OTHER PUBLICATIONS

Supplementary European Search Report—EP20961926—Search Authority—Munich—Sep. 19, 2024.

(Continued)

*Primary Examiner* — Motilewa Good-Johnson
(74) *Attorney, Agent, or Firm* — QUALCOMM Incorporated

(57) ABSTRACT

The present disclosure relates to graphics processing. An apparatus of the present disclosure may determine visibility streams corresponding to a target and a set of bins into which the target is divided. The apparatus may select one of a first rendering mode or a second rendering mode for the target based on the first visibility stream and based on the set of second visibility streams. When the first rendering mode is select, the apparatus may configure each of the set of bins into a first subset associated with a first type of rendering pass or a second subset associated with a second type of rendering pass. The apparatus may then render the target based on the selected one of the first rendering mode or the (Continued)

second rendering mode and, if applicable, based on the first rendering pass type or the second rendering pass type.

30 Claims, 5 Drawing Sheets

(56) References Cited

U.S. PATENT DOCUMENTS

| | | | |
|---|---|---|---|
| 7,505,036 B1* | 3/2009 | Baldwin | G06T 15/503 345/419 |
| 8,830,246 B2 | 9/2014 | Seetharamaiah et al. | |
| 9,218,689 B1* | 12/2015 | Baldwin | G06T 7/60 |
| 9,286,649 B2 | 3/2016 | Balci et al. | |
| 2003/0179208 A1* | 9/2003 | Lavelle | G06T 15/005 345/539 |
| 2007/0279421 A1* | 12/2007 | Gruber | G06T 15/005 345/502 |
| 2013/0135322 A1 | 5/2013 | Seetharamaiah et al. | |
| 2013/0241938 A1* | 9/2013 | Gruber | G06T 11/40 345/501 |
| 2014/0198119 A1* | 7/2014 | Seetharamaiah | G06T 11/40 345/581 |
| 2014/0354661 A1* | 12/2014 | Balci | G06T 1/20 345/522 |
| 2015/0302546 A1 | 10/2015 | Balci et al. | |
| 2015/0379663 A1* | 12/2015 | Gruber | G06T 1/20 345/522 |
| 2016/0055608 A1 | 2/2016 | Frascati et al. | |
| 2016/0117855 A1 | 4/2016 | Lee et al. | |
| 2016/0125649 A1 | 5/2016 | Jeong et al. | |
| 2016/0148426 A1 | 5/2016 | Son et al. | |
| 2016/0260249 A1* | 9/2016 | Persson | G06T 1/20 |
| 2016/0322031 A1* | 11/2016 | Liao | G06T 15/405 |
| 2016/0364901 A1* | 12/2016 | Balci | G06T 15/005 |
| 2016/0371873 A1* | 12/2016 | Mantor | G06T 15/005 |
| 2017/0061574 A1 | 3/2017 | Hui et al. | |
| 2017/0148203 A1* | 5/2017 | Hakura | G06T 17/20 |
| 2018/0189923 A1 | 7/2018 | Zhong et al. | |
| 2018/0189925 A1* | 7/2018 | Lee | G09G 5/363 |
| 2019/0035363 A1* | 1/2019 | Schluessler | G09G 3/003 |
| 2019/0220411 A1 | 7/2019 | Nellutla et al. | |
| 2020/0020067 A1* | 1/2020 | Liang | G06T 15/005 |
| 2020/0098165 A1 | 3/2020 | Gruber | |
| 2020/0312020 A1 | 10/2020 | Zhong et al. | |
| 2020/0380745 A1* | 12/2020 | Bhiravabhatla | G06T 11/40 |
| 2021/0287418 A1* | 9/2021 | Acharya | G06T 11/40 |
| 2023/0092394 A1* | 3/2023 | Neelambaran | G06T 3/40 345/660 |
| 2023/0343016 A1* | 10/2023 | Alla | G06T 15/04 |
| 2024/0013336 A1* | 1/2024 | Du | G06T 1/60 |
| 2024/0104684 A1* | 3/2024 | Bhiravabhatla | G06T 15/005 |
| 2024/0169649 A1* | 5/2024 | Ruud | G06T 15/40 |

FOREIGN PATENT DOCUMENTS

| | | |
|---|---|---|
| TW | 201712631 A | 4/2017 |
| WO | 2014193645 | 12/2014 |

OTHER PUBLICATIONS

International Search Report and Written Opinion—PCT/CN2020/130048—ISA/EPO—Aug. 16, 2021.

International Search Report and Written Opinion—PCT/CN2020/129706—ISA/EPO—Jun. 30, 2021.

Xu W., et al., "Adaptive Refinement for Terrain Rendering on GPU", Journal of Computer-Aided Design & Computer Graphics, vol. 22, No. 10, 10 Pages, Oct. 15, 2010, pp. 105-113, 119.

* cited by examiner

METHODS AND APPARATUS FOR SELECTION OF RENDERING MODES

CROSS-REFERENCE TO RELATED APPLICATION(S)

This application is a National Phase entry of PCT Application No. PCT/CN2020/130048, entitled "METHODS AND APPARATUS FOR SELECTION OF RENDERING MODES" and filed on Nov. 19, 2020, which 1 claims priority of PCT Application No. PCT/CN2020/129706, entitled "METHODS AND APPARATUS FOR SELECTION OF RENDERING MODES" and filed on Nov. 18, 2020, both of which are expressly incorporated by reference herein in their entirety.

TECHNICAL FIELD

The present disclosure relates generally to processing systems and, more particularly, to one or more techniques for graphics processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

Various devices and other apparatuses configured to display graphics may include multiple processors and multiple memories. Illustratively, an example device may include a central processing unit (CPU) and a graphics processing unit (GPU), as well as system memory and graphics memory (GMEM). Potentially, the GPU may render some graphics in GMEM, which may then be copied to system memory for output on a display of the example device. However, other configurations are also possible.

In some aspects, the GPU may implement a tiled rendering architecture in order to reduce power consumption and/or conserve memory bandwidth, e.g., relative to a full-frame rendering architecture. According to such a tiled rendering architecture, a scene may be divided into multiple bins that each represents a section of the full scene. Various operations may then be performed over each bin, such as respective evaluations of the multiple bins. In practice, each bin may be rendered into GMEM until the full scene is rendered in GMEM, and the full scene may be subsequently stored from GMEM to system memory for display. Such an approach to scene display may be referred to as "visibility bin rendering mode," or simply "bin rendering mode."

In some situations, however, dividing scenes into multiple bins may be undesirable, e.g., as the performance associated therewith may be unsatisfactory for some rending implementations. For example, overhead commensurate with scene rendering using the bin rendering mode may cause device performance that is unsatisfactory. For example, repeated operations for rendering scenes, including storing the contents of GMEM into system memory and also loading the contents of system memory into GMEM, may incur appreciable overhead having the potential to degrade device performance. Therefore, a need exists for a rendering mode that may mitigate or reduce the overhead commensurate with rendering into GMEM.

The present disclosure provides various aspects of a rendering mode in which a scene may be rendered into system memory without first being rendered into GMEM. Such a rendering mode may be referred to as a "visibility direct mode," which may differ from the bin rendering mode. As provided for by the present disclosure, the visibility direct rendering mode may be implemented in addition or as an alternative to some other rendering modes, e.g., including rendering modes involving tiled or binned rendering architectures, such as the aforementioned bin rendering mode.

Illustratively, rendering architectures involving a visibility direct mode may generate visibility information and/or other rendering-related information (e.g., depths, blending, primitives, etc.) based on a full frame or full scene. In this way, rendering architectures implementing a visibility direct mode have the potential to improve resource utilization (e.g., time and/or computational resources), such as by avoiding dividing full scenes into multiple bins and/or avoiding rendering into GMEM as a precondition of rending into system memory.

Conceptually, the visibility direct mode may be similar in some ways to bin rendering mode in that a full scene itself may be treated as one bin or tile, which includes an entire scene; however, the visibility direct mode may offer some functionality more suited to situations in which the bin rendering mode might otherwise incur appreciable overhead (e.g., an unacceptable or substantial amount of overhead). Specifically, rendering a scene via the visibility direct mode may circumvent division of the scene into multiple bins, but instead may cause a full scene to be treated as one bin that is evaluated and rendered. In practice, then, the full scene may be directly rendered into system memory when the visibility direct mode is used (instead of first rendering multiple bins into GMEM before system memory, as with the bin rendering mode).

While aspects of the visibility direct mode described herein may be implemented to improve rendering architectures in some instances (e.g., some overhead may be reduced when rendering some scenes on some systems), the visibility direct mode may not be universally advantageous relative to the bin rendering mode. Rather, one or more features of the bin rendering mode may cause the bin rendering mode to be preferable to the visibility direct mode in some other instances. For example, attributes, characteristics, etc. of a device and/or of one or more scenes to be rendered thereon may vary, and some such variations may affect the overhead (e.g., time overhead, resource overhead, etc.) and/or other metric(s) indicative of the performance of implementing a certain mode for rendering a respective scene on a specific device (or other system).

Currently, no practical approaches exist to selecting one rendering mode from multiple potential rendering modes when rendering at least a portion of at least one scene on a device (e.g., a personal computing device, a smartphone, a tablet computer, another computing system, etc.). Therefore, a need exists for mechanisms that determine which rendering mode should be utilized when rendering at least a portion of one or more scenes using a specific architecture of a device.

Thus, the present disclosure provides various techniques and solutions for selecting one rendering mode from multiple potential rendering modes when rendering at least a portion of at least one scene using a specific device. Such techniques and solutions may be described in the context of selecting between a bin rendering mode and a visibility direct mode. For example, a device may dynamically select between a bin rendering mode and a visibility direct mode for each of multiple scenes, which may be implemented when rendering scenes of a stream. The selection between rendering modes may be based upon one or more conditions or parameters associated with the scene (e.g., including one or more bins into which the scene may be divided) and/or one or more characteristics or configurations of the device performing the rendering (e.g., hardware and/or software capabilities, device settings, etc.).

Furthermore, some example aspects described in the context of rendering a full scene using a visibility direct mode may be employed at a more granular level. That is, some operations associated with the rendering of a scene using the visibility direct mode may be incorporated into the rendering process for one or more individual bins into which a scene has been divided. For example, once a scene has been divided into multiple bins (e.g., as when the bin rendering mode is selected over the visibility direct mode when rendering a scene), at least one of the multiple bins may be rendered directly into system memory, e.g., based on information associated with the at least one bin and/or the device rendering the scene, in order to avoid accessing GMEM.

Effectively, the present disclosure describes various aspects of a device that is configured to render a scene more efficiently than previous devices. In particular, aspects described herein provide for selecting a rendering mode (or set of operations) at various stages of the rendering process that is preferable (e.g., incurs a lower or the lowest relative overhead) to at least one other rendering mode (or other set of operations) based upon at least one of the scene being rendered, the specific portion (e.g., bin or tile) of the scene being rendered, the specific device that is rendering the scene, and/or one or more other factors. Thus, a device may iteratively configure the operations commensurate with rendering a scene in a manner that is scene- and/or device-dependent, and in so doing, may improve scene-rendering performance. Such an operational configuration may change over time—e.g., one of the bin rendering mode and the visibility direct mode may be selected when each scene is rendered and/or may be selected at a certain periodicity. Further, an operational configuration may be predicated upon the device itself, such as the hardware, software, and/or firmware with which the device is configured—e.g., one of the bin rendering mode and the visibility direct mode may be selected based on characteristics and/or capabilities of a memory, a central processing unit (CPU), a graphics processing unit (GPU), etc., such as a GPU tier.

In some aspects, the present disclosure describes various techniques and solutions to determining whether to render scenes using bin rendering mode or visibility direct mode. Such a determination may be dynamically performed, e.g., when a scene is provided for display, as opposed to statically performed when a device is powered on, when a display is initiated, etc. The present disclosure describes various aspects of such a determination, as well as the condition(s) upon which the determination may be predicated. In some configurations described herein, dynamically switching between a bin rendering mode and visibility direct mode may measurably reduce overhead, e.g., leading to a performance improvement of between approximately 3% and 10% on some applications for which scenes may be rendered on a device.

In some other aspects, the present disclosure describes various techniques and solutions to determining whether to render bins of a scene in a manner similar to the aforementioned bin rendering mode or visibility direct mode. In effect, once a determination is made to render a scene using the bin rendering mode, further decisions may be made with regard to how each bin should be rendered—that is, for each bin into which a scene is divided, a respective determination may be made as to whether a bin should be first rendered to GMEM and then stored in system memory or a bin should be directly rendered to system memory such that the GMEM is avoided.

The present disclosure describes various methods, computer-readable media, and apparatuses for performing graphics processing. Performance of graphics processing may include storing some discrete data into at least one of multiple memory locations. Such discrete data may include graphical content to be output on a display as a display content, and may be referred to as a "target." For example, a target may include an image, a scene, a frame, and the like.

In a first aspect of the disclosure, a first method, a first computer-readable medium, and a first apparatus are provided. The first apparatus may be a CPU, GPU, or any apparatus that can perform graphics processing. The first apparatus may include or may be communicatively connected with a GMEM and a system memory. The first apparatus may be configured to determine a first visibility stream corresponding to a target based on a first visibility pass for the target. The first apparatus may be further configured to determine a set of second visibility streams respectively corresponding to a set of bins based on a set of second visibility passes for the set of bins, the target being divided into the set of bins. The first apparatus may be configured to select one of a first rendering mode or a second rendering mode for the target based on the first visibility stream and based on the set of second visibility streams, the first rendering mode including rendering each of the set of bins and the second rendering mode including directly rendering the target. The first apparatus may be configured to then render the target based on the selected one of the first rendering mode or the second rendering mode.

In a second aspect of the disclosure, a second method, a second computer-readable medium, and a second apparatus are provided. The second apparatus may be a CPU, GPU, or any apparatus that can perform graphics processing. The second apparatus may include or may be communicatively connected with a GMEM and a system memory. The second apparatus may be configured to determine respective visibility of primitives associated with each of a set of bins, each of the set of bins representing at least a respective portion of a target. The second apparatus may be further configured to determine, for each of the set of bins, a respective rendering pass type from a plurality of rendering pass types based on the respective visibility of primitives, the plurality of rendering pass types comprising a first rendering pass type associated with rendering a bin into GMEM and a second rendering pass type associated with refraining from rendering a bin into the GMEM. The second apparatus may be configured to then render the target based on the respective rendering pass type determined for each of the set of bins.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
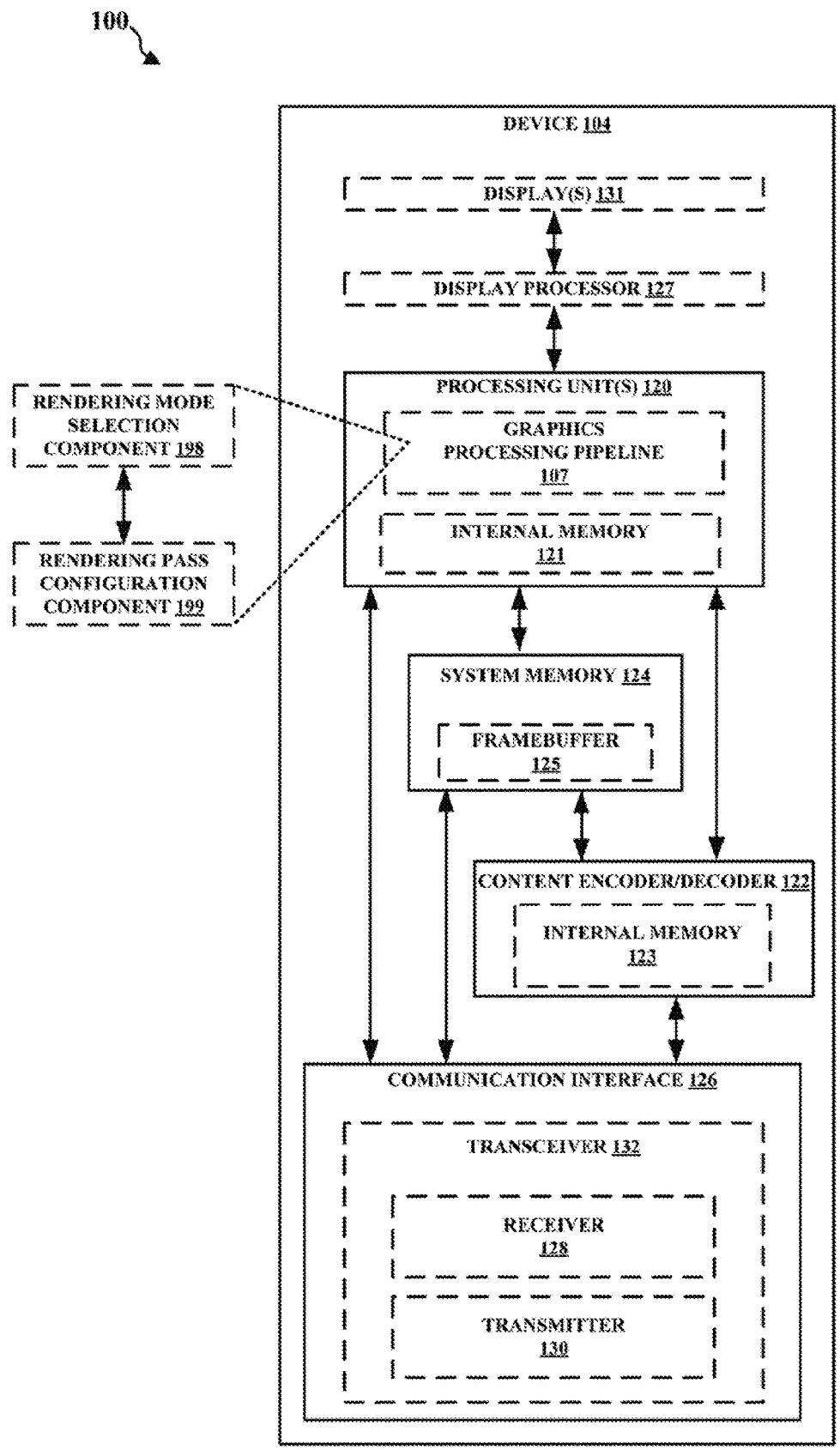
FIG. 1 is a block diagram that illustrates an example content generation system in accordance with one or more aspects of the present disclosure.

According to various aspects, a graphics processing unit (GPU) may implement a tiled rendering architecture in which a target (e.g., a scene, a frame, an image, other graphic, etc.), which may be regarded as full frame, is divided into multiple sections, referred to as "bins." A respective visibility pass then may be performed on each of the bins to identify primitives (e.g., triangles) that are visible in each bin.

Memory included on-chip (e.g., GPU memory) may feature high bandwidth and/or low latency, e.g., relative to some separate system memory, such as double data rate (DDR) random access memory (RAM). Such on-chip memory may be subject to some capacity constraints in mobile devices (e.g., smartphones, smartwatches, etc.) relative to other (larger) computing devices (e.g., desktop computers, laptop computers, etc.), for example, due to space and/or cost considerations. The tiled rendering architecture may be particularly suited to relatively limited on-chip memory of a GPU, as each bin is rendered to on-chip memory to exploit the high bandwidth and/or low latency characteristics thereof.

To then render a target with tiled rendering, each bin may rendered into graphics memory (GMEM). After each bin has been rendered into GMEM, the target resides in GMEM. Subsequently, the target may be stored in system memory (e.g., in a framebuffer of system memory), e.g., after all visible objects are drawn in GMEM. In other words, the target may be copied from GMEM to system memory, such as by copying data of each bin from GMEM to a respective corresponding region of the framebuffer in system memory. From system memory, the target is displayed, e.g., on a graphical user interface (GUI) or other similar display with which a device is configured.

The foregoing approach to rendering a target, in which a tiled rendering architecture is implemented, may be referred to as "visibility bin rendering mode" or simply "bin rendering mode." In some instances, bin rendering mode may reduce power consumption and/or conserve memory bandwidth relative to one or more other rendering modes, such as those in which a target is directly rendered and/or not divided into bins.

In particular, the bin rendering mode may exploit potentially high bandwidth and/or low latency attributes of GMEM to mitigate (or even eliminate) some data traffic to system memory (or other host memory), such as data traffic related to primitives that are occluded and/or other unnecessary data traffic. Such reduction of data traffic may reduce consumption of power (e.g., battery capacity) and/or other computational resources (e.g., GPU and/or CPU load). Therefore, the bin rendering mode may be suitable for rendering a target that is relatively complex, such as a scene having a relatively high amount of primitives, overdraw, blending, and/or other such characteristic that may impart, or at least contribute to, the intricacy, dimensionality, etc. of the scene.

In some other instances, however, the load(s) on the GPU and/or central processing unit (CPU) commensurate with rendering certain scenes may be unsuitable for bin rendering mode. For example, rendering scenes in which the amount of stores from GMEM to system memory and/or the amount of loads from system memory to GMEM is/are significant may adversely impact GPU and/or CPU performance.

One alternative to bin rendering mode may be a mode in which a target is treated as a single bin for which full-frame visibility pass is performed. According to such treatment, the target may be directly rendered into system memory, which may effectively circumvent GMEM and associated stores and loads. Such an approach to rendering a target directly into system memory as a single bin may be referred to as "visibility direct mode."

As primitives or triangles may be drawn (directly) to the framebuffer of system memory with the visibility direct mode, some overhead commensurate with the bin rendering mode may be avoided. For example, the visibility direct mode may reduce (or potentially even eliminate) the overhead associated with a binning pass, resolve(s) from GMEM to system memory in a rendering pass, unresolve(s) from system memory to GMEM in a rendering pass, and/or other operation(s) performed during implementation of the bin rendering mode but not during implementation of the visibility direct mode. Such direct framebuffer rendering may be suitable for rendering a target that is simple and/or lower complexity, such as a scene having a relatively lower amount of primitives or triangles, overdraw, blending, and the like.

The conditions upon which rendering targets are based are often situation-specific, and therefore, the mode offering better performance may dynamically change, e.g., according to an application providing the rendering target, the frequency of rendering, and so forth. Furthermore, characteristics of a device configured to render a target may appreciably affect which mode better suited to render the target. Therefore, the capability to dynamically select between modes for rendering may improve device performance, e.g., relative to using one mode or statically selecting one mode for use across all applications.

Some aspects of the present disclosure describe dynamic selection between a bin rendering mode and a visibility direct mode. Such dynamic selection may be implemented by software (or firmware) of a device or other apparatus. Specifically, a set of conditions may be determined (e.g., computed, estimated, evaluated, etc.), and then one of the bin rendering mode or visibility direct mode may be dynamically selected based on the set of conditions. For example, the set of conditions may be based on a set of visibility passes associated with the target (e.g., full-frame scene), such as various operations commensurate with the set of visibility passes (e.g., resolves, unresolves, blending, etc.), hardware configurations (e.g., limitations) in relation to the set of visibility passes, and the like.

Some aspects of the present disclosure in which one of bin rendering mode or visibility direct mode is dynamically selected may improve performance of applications on a device, e.g., relative to using only one or the other of bin rendering mode and visibility direct mode. For example, performance improvements of approximately 3% to 10% may be realized for multiple applications through implementation of such dynamic mode selection described herein. Potentially, power and/or memory bandwidth may conserved, as well.

In some other aspects of the present disclosure, the various techniques and solutions described with respect to dynamically selecting between rendering modes for each target (e.g., scene, image, frame, etc.) may be employed at an even more granular level. For example, the various operations described with respect to the bin rendering mode and visibility direct mode may be implemented even within a target, and specifically, may be implemented to render each of the bins into which a target is divided.

To render a target, then, a rendering mode to be used at a full-frame level may be first determined. Where the visibility direct mode is selected, then the target may be treated as a single bin and rendered into system memory (e.g., directly rendered in the framebuffer) without rendering in GMEM. Where the visibility direct mode is not selected, however, the target may be rendered at a bin level, e.g., such that a respective determination is made for each bin of whether a rendering pass is functionally similar to a bin rendering mode or a visibility direct mode.

In effect, a respective determination may be made for each bin of a plurality of bins of whether to render the bin into GMEM and then store that bin data in system memory from GMEM or to render the bin into system memory without first rendering in GMEM. For example, a respective set of conditions may be determined for each bin, which may include some conditions similar to and/or different from those determined when selecting between the bin rendering mode and the visibility direct mode for the target. Based on the respective set of conditions, each bin then may be either rendered first into GMEM and then stored in system memory or rendered into system memory without rendering into GMEM.

A bin-by-bin selection of rendering implementation may be predicated upon the target being divided into a plurality of bins; therefore, a determination of whether to select the bin rendering mode or the visibility direct mode for the target may be established first. Upon selection of the bin rendering mode, a respective determination of how to render each bin may then be made. However, such a bin-by-bin selection of rendering implementation may also be implemented when the bin rendering mode is used regardless of any determination. For example, a bin-by-bin selection of rendering implementation may be used when a binning or tiled rendering architecture is used by default, such as where the visibility direct mode (on a full-frame level) is unavailable or absent from a device or where a device is configured with the visibility direct mode deactivated or turned off but with the bin rendering mode activated or turned on.

As aforementioned, the bin rendering mode may be more suitable (e.g., more economical in terms of power and/or other computational resources) for a target that is relatively complex (e.g., a larger amount of primitives or triangles, overdraw, blending, etc.), whereas the visibility direct mode may be more suitable for a target that is relatively less complex or relatively more simple (e.g., a smaller amount of primitives or triangles, blending, overdraw, etc.). At a finer granularity, however, a target may include some areas of relatively greater complexity and some other areas of relatively lesser complexity. Therefore, a bin-level determination may be made as to whether a respective bin should be either rendered into GMEM and then stored in system memory from GMEM or rendered into system memory without first rendering into GMEM.

According to some aspects of the present disclosure, each bin may be evaluated in order to determine a respective level of complexity associated therewith. Potentially, such levels of complexity may be represented (e.g., numerically) as complexity values, with each bin having a respective complexity value determined therefrom. For example, a respective complexity value may be based on an amount of primitives at least partially within each bin, overdraw within each bin, blending within each bin, and/or other such characteristic of each bin that may directly or indirectly affect the rendering process of each bin.

Effectively, a respective complexity value may function as a metric that may represent or estimate the overhead and/or resource consumption commensurate with rendering each of the bins. By way of illustration and not limitation, some examples of overhead and/or resource consumption associated with rendering each of the bins (and that may be represented or approximated by a respective complexity value) may include the amount of power consumed (e.g., battery consumption), the number of instruction cycles consumed, the amount and/or duration of memory consumed (e.g., including different types of memories), the load on a GPU, the load on a CPU, the time duration, and/or other factor(s) associated with rendering each bin.

Based on the evaluation of a respective complexity level, a respective determination may be made for each of the bins as to whether a first rendering mode including GMEM (e.g., similar to the bin rendering mode described herein) or a second rendering mode excluding GMEM (e.g., similar to the visibility direct mode described herein) should be used. For example, a first subset of bins may be rendered into GMEM based on the respective complexity values corresponding to the first subset of bins, and then the first subset of bins (e.g., data of the first subset of bins) may be copied from GMEM into system memory, such as by copying data of each bin to a respective corresponding region in the framebuffer of system memory. A second subset of bins, however, may be rendered into system memory without being rendered into GMEM—e.g., each of the second subset of bins may be directly rendered to a respective corresponding region in the framebuffer of system memory.

Various aspects and other details related to determining rendering modes for targets (e.g., images, scenes, frames, etc.), as well as for bins into which targets may be divided, are further described herein with reference to the accompanying drawings.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, GPUs, general purpose GPUs (GPGPUs), CPUs, application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a RAM, a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for selecting a rendering mode (e.g., a bin rendering mode or visibility direct mode) for a full-frame target, and further, for selecting a respective type of rendering pass (e.g., a rendering pass type including rendering into GMEM and a rendering pass type excluding rendering into GMEM) for each of a plurality of bins into which a target is divided. Each of the frame-level rendering mode selection and the bin-level rendering pass type selection may be dynamically performed, thereby improving the rendering of graphical content, for example, by reducing the power consumed (e.g., battery level), reducing latency, and/or reducing load on a processing unit (e.g., any processing unit configured to perform one or more techniques described herein, such as a GPU). For example, the present disclosure describes techniques for rendering architectures in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a GPU may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, e.g., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure.

In the example shown, the device 104 may include at least one processing unit(s) 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. The illustrated components of the device 104 may be configured to communicate, e.g., via one or more buses and/or one or more other wired and/or wireless connections. While the system 100 shows various connections for communication between components, some different and/or additional connections and/or other communications paths may be configured in some other examples without departing from the scope of the present disclosure.

Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The at least one processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static RAM (SRAM), dynamic RAM (DRAM), synchronous DRAM (SDRAM), DDR SDRAM (e.g., DDR2, DD3, etc.), erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

In some aspects, the system memory 124 may include or may be communicatively coupled with a framebuffer 125. The framebuffer 125 may be a section, potentially dedicated, of memory (e.g., RAM) that may drive output on the display 131. For example, the framebuffer 125 may store data representing pixels of a frame or scene, with such data being stored in the framebuffer 125 according to a respective region of the frame or scene presented on the display 131.

The at least one processing unit 120 may include at least one of a CPU, a GPU, a GPGPU, or any other processing unit(s) that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, CPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. Some aspects of the present disclosure may be implemented at least partially in software, and therefore, the processing unit 120 may store instructions for the software in a suitable computer-readable storage medium, which may be non-transitory. For example, at least a portion of the internal memory 121 may include computer-executable instructions or code, and the at least one processing unit 120 may execute the instructions in hardware using one or more processors to perform various aspects described by the present disclosure. Any of the foregoing, including hardware, software, firmware, a combination thereof, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, ASICs, FPGAs, ALUs, DSPs, video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the device 104 may include one or more components, each of which may be implemented as hardware, software, firmware, or some combination thereof, that are configured to render a target, e.g., for presentation on the display 131. As described herein, a target may include a full or entire frame, and may also be referred to as a "render target," "target scene," "target frame," "target image," and/or other terminology referring to graphical content. Thus, a target may include an image, a scene, a frame, and the like. In some aspects, a target may include graphical content for individual or stand-alone output or display content, such as a still image, still frame, and/or still scene. In some other aspects, however, a target may include data that is a portion or segment of graphical content that is sequentially or consecutively graphically output and/or includes display content that changes over time, such as an image in a series of images composing an animated image, a frame or scene of a plurality of frames or scenes in a video (e.g., including streaming video), and the like.

In order to render a target, the graphics processing pipeline 107 may include at least a rendering mode selection component 198. The rendering mode selection component 198 may be configured to determine a first visibility stream corresponding to a target based on a first visibility pass for the target, and to determine a set of second visibility streams respectively corresponding to a set of bins based on a set of second visibility passes for the set of bins, with the target being divided into the set of bins. Further, the rendering mode selection component 198 may be configured to select one of a first rendering mode or a second rendering mode for the target based on the first visibility stream and based on the set of second visibility streams; the first rendering mode including rendering each of the set of bins, and the second rendering mode including directly rendering the target. The rendering mode selection component 198 may then render the target based on the selected one of the first rendering mode or the second rendering mode.

By way of illustration, and not limitation, the first rendering mode may include rendering the target bin-by-bin, e.g., with the target being divided into a plurality of bins that each represents a respective portion of the full-frame target, whereas the second rendering mode may be a visibility direct mode in which the target is rendered into system memory. Functionally, with the visibility direct mode, the target may be treated as a single bin, and therefore, the first visibility stream corresponding thereto may include information associated with the full frame (represented as the single bin).

In some aspects, the first rendering mode may include the bin rendering mode. Accordingly, the rendering mode selection component 198 may render the target by rendering each of the plurality of bins in the GMEM—for example, the GMEM may include at least a portion of internal memory 121 and/or internal memory 123, such as a buffer, cache, and/or other section of memory, which may or may not be dedicated. In some aspects, the GMEM may feature a higher bandwidth and/or lower latency than the system memory 124—e.g., the GMEM may include at least a portion of internal memory 121 having a higher bandwidth and/or lower latency than the system memory 124, which may include DDR SDRAM and/or other RAM. In some further aspects, the GMEM may be on-chip memory—e.g., the GMEM may include at least a portion of internal memory 121 that is on-chip memory of a GPU of the processing unit 120.

Thus, according to such aspects, the data of the plurality of bins representing the target may be stored in GMEM. The rendering mode selection component 198 may then store (e.g., copy) the target stored in GMEM to the system memory 124. For example, the rendering mode selection component 198 may copy respective data of each bin in GMEM to a respective corresponding region in the framebuffer 125 of the system memory 124.

In some other aspects, the rendering mode selection component 198 may select the first rendering mode (e.g., the bin rendering mode) such that the target is rendered at a bin level, with a respective one of the memory locations into which each of the plurality of bins is rendered being determined bin-by-bin. To that end, the rendering mode selection component 198 may be communicatively coupled with a rendering pass configuration component 199, which may configure rendering of each of the plurality of bins into which the target is divided.

For example, the rendering pass configuration component 199 may configure each of the plurality of bins into one of a first subset of bins or a second subset of bins based on respective visibility of primitives associated with each of the plurality of bins and/or based on a respective visibility stream corresponding to each of the plurality of bins. In some aspects, a respective second visibility stream of the set of second visibility streams may indicate a respective visibility of primitives associated with a respective bin of the plurality of bins. As further described herein, the rendering pass configuration component 199 may render each of the first subset of bins according to a first type of rendering pass (e.g., similar to the bin rendering mode) and each of the second subset of bins according to a second type of rendering pass (e.g., similar to the visibility direct rendering mode).

However, when the rendering mode selection component 198 selects the second rendering mode, the rendering mode selection component 198 may render the target by rendering the target into the system memory 124 without rendering the target into GMEM (e.g., without rendering the target into the internal memory 121). For example, the target may treated as a single bin (e.g., a single bin corresponding to or encompassing the full frame), and the rendering mode selection component 198 may directly render the (full-frame) target in the framebuffer 125 of the system memory 124. In so doing, the rendering mode selection component 198 may refrain from rendering the target in the GMEM (e.g., the single bin corresponding to the full frame may not be rendered into the GMEM, such as the internal memory 121).

In one aspect, the rendering mode selection component 198 may determine low-resolution z (LRZ) information associated with an LRZ buffer for target (e.g., for the single bin corresponding to the full-frame target). The rendering mode selection component 198 may be configured to select the one of the first rendering mode or the second rendering mode further based on the LRZ information. The rendering mode selection component 198 may use the LRZ information to detect an overdraw condition, such as an amount or degree of overdraw. For example, the rendering mode selection component 198 may determine a number of visible pixels associated with rendering the target based on the LRZ information, and the rendering mode selection component 198 may be configured to select the one of the first rendering mode or the second rendering mode further based on a ratio of the number of visible pixels to a total number of pixels associated with rendering the target.

In some aspects, the rendering mode selection component 198 may determine one or more values associated with rendering the target that are indicative of "clear" (e.g., clear meaning no visible pixels) based on the LRZ information. The rendering mode selection component 198 may determine LRZ information for each of set of sections or blocks into which the target (e.g., pixels of the target) is separated. When the rendering mode selection component 198 determines all values of a section or block indicate clear, then the rendering mode selection component 198 may determine that no visible pixels are to be written to that section or block. For other sections or blocks, the rendering mode selection component 198 may determine the number of visible pixels after the LRZ information is determined.

In still further aspects, the rendering mode selection component 198 may be configured to determine, based on the first visibility stream and/or based on the set of second visibility streams, at least one of a number of resolves, a number of unresolves, and/or an amount of blending associated with rendering the target. The rendering mode selection component 198 may be configured to select the one of the first rendering mode or the second rendering mode based on the at least one of the number of resolves, the number of unresolves, and/or the amount of blending.

In yet another aspect, the rendering mode selection component 198 may be configured to select the one of the first rendering mode or the second rendering mode further based on at least one configuration for concurrent resolves or concurrent unresolves associated with rendering the target.

In still another aspect, the rendering mode selection component 198 may be configured to select the one of the first rendering mode or the second rendering mode based on a configuration for at least one clear operation concurrent with at least one resolve operation associated with rendering the target.

As aforementioned, a respective determination may be made as to how to render each bin of the plurality of bins when the first rendering mode is selected. In connection therewith, the graphics processing pipeline 107 may further include a rendering pass configuration component 199, e.g., communicatively coupled with the rendering mode selection component 198 and configured to perform various operations when the rendering mode selection component 198 selects the first rendering mode. Specifically, the rendering pass configuration component 199 may configure each of the plurality of bins into one of a first subset of bins or a second subset of bins, with the first subset set of bins being rendered different from the second subset of bins.

The rendering pass configuration component 199 may configure bins into the first or second subsets based on visibilities of primitives (e.g., based on visibility streams). Therefore, the rendering pass configuration component 199 may be configured to determine a respective visibility of primitives associated with each of the set of bins (e.g., a respective visibility stream corresponding to each of the set of bins), with each bin representing at least a respective portion of the target. As the rendering mode selection component 198 may determine the aforementioned set of second visibility streams respectively corresponding to the set of bins, the respective visibility streams corresponding to the set of bins may be the set of second visibility streams— e.g., the rendering pass configuration component 199 may determine the respective visibilities of primitives associated with the set of bins (e.g., the respective visibility streams corresponding to the set of bins) by obtaining the set of second visibility streams from the rendering mode selection component 198.

The rendering pass configuration component 199 may then determine, for each of the set of bins, a respective rendering pass type from a plurality of available rendering pass types based on respective visibility of primitives associated with a respective bin (e.g., a respective visibility stream). The plurality of available rendering pass types may include a first rendering pass type associated with rendering a bin into GMEM and a second rendering pass type associated with refraining from rendering a bin into GMEM. For example, the first rendering pass type may be similar to the bin rendering mode that includes rendering into the GMEM and then resolving into the system memory 124, whereas the second rendering pass type may be similar to the visibility direct mode that includes (directly) rendering into the system memory 124 without rendering into the GMEM.

The rendering pass configuration component 199 may then render the target based on the respective rendering pass type determined for each of the set of bins. When the first rendering pass type is determined as the respective rendering pass type for each of the first subset of bins, the rendering pass configuration component 199 may render each of the first subset of bins into the GMEM (e.g., into the internal memory 121). The rendering pass configuration component 199 may then store (e.g., copy, resolve, etc.) data of each of the first subset of bins from the GMEM to the system memory 124. As each of the first subset of bins may represent a respective region of the target, the rendering pass configuration component 199 may copy data of each of the first subset of bins from the GMEM to a respective corresponding region of the target in the framebuffer 125 of the system memory 124.

However, when the second rendering pass type is determined as the respective rendering pass type for each of the second subset of bins, the rendering pass configuration component 199 may render each of the second subset of bins into the system memory 124 without rendering into the GMEM (e.g., the internal memory 121). Specifically, the rendering pass configuration component 199 may render each of the second subset of bins to a respective corresponding region of the target in the framebuffer 125 of the system memory 124.

In some aspects, the rendering pass configuration component 199 may render each of the first subset of bins before rendering each of the second subset of bins. For example, the rendering pass configuration component 199 may perform at least one rendering pass of the first type (e.g., a tiled rendering pass and/or a bin rendering pass) for each of the first subset of bins. Once complete (e.g., once data of the first subset of bins is stored from the GMEM to the corresponding regions of the target in the framebuffer 125), the rendering pass configuration component 199 may perform at least one rendering pass of the second type (e.g., a direct rendering pass and/or a visibility direct rendering pass) for the second subset of bins.

The rendering pass configuration component 199 may render each of the first subset of bins into the GMEM. After the first subset of bins is rendered into the GMEM, the rendering pass configuration component 199 may store (e.g., copy, resolve, etc.) each of the first subset of bins from the GMEM into the system memory 124. Accordingly, the respective target regions corresponding to the first subset of bins may be stored in the framebuffer 125 of the system memory 124. Subsequently, the rendering pass configuration component 199 may render each of the second set of bins into the system memory 124, which the rendering pass configuration component 199 may perform in a single rendering pass for all of the second subset of bins.

In some aspects, for each of the second subset of bins, the rendering pass configuration component 199 may render a respective bin using a bin mask that is based on a depth buffer associated with the respective bin. The bin mask may be configured for early Z or depth rejection, and therefore, the rendering pass configuration component 199 may avoid or refrain from rendering some or all pixels associated with Z value(s) and/or depth(s) that may not be visible and/or may be overdrawn when the target is output, e.g., as display content and/or on the display 131.

In some aspects, the rendering pass configuration component 199 may be configured to determine (e.g., generate) a bin mask. Potentially, the rendering pass configuration component 199 may determine a plurality of bin masks—e.g., the rendering pass configuration component 199 may determine a respective bin mask for each of the second subset of bins. The rendering pass configuration component 199 may determine a bin mask based on LRZ information and/or an LRZ buffer. The rendering pass configuration component 199 may determine depths for pixels within the second subset of bins, and may determine a bin mask based on the determined pixel depths.

As rendering the target, and bins into which the target is divided, may be based on various characteristics or parameters associated therewith, the rendering pass configuration component 199 may configure each of the plurality of bins into one of the first subset of bins or the second subset of bins based on such characteristics and/or features. For example, the rendering pass configuration component 199 may configure each of the plurality of bins into one of the first subset of bins or the second subset of bins based on at least one of overdraw associated with a respective bin, blending associated with the respective bin, and/or a number of primitives or triangles associated with the respective bin.

In another example, the rendering pass configuration component 199 may configure each of the plurality of bins into one of the first subset or the second subset based on information associated with one or more components of the system 100, such as one or more configurations associated with capabilities and/or characteristics of the system 100. For example, the rendering pass configuration component 199 may configure each of the plurality of bins into one of the first subset or the second subset based on one or more configurations associated with concurrent resolve(s), concurrent unresolve(s), clear operation(s) concurrent with resolve(s) and/or unresolved(s), and the like. Such configurations associated with the foregoing operations (e.g., concurrent operations) may be based on the capabilities of the system 100, e.g., as the capabilities of the system 100 may enable or restrict some operations and/or concurrent execution thereof.

To that end, the rendering pass configuration component 199 may be configured to determine (e.g., calculate, compute, generate, etc.), for each of the plurality of bins, a respective complexity value, which may be a number that represents or estimates the complexity associated with rendering a bin. The rendering pass configuration component 199 may determine a respective complexity value for one of the plurality of bins based on the respective visibility of primitives (e.g., a respective visibility stream of the set of second visibility streams) of the one bin and/or based on other information associated with the one bin and/or the system 100. In some aspects, the rendering pass configuration component 199 may determine a respective complexity value for one of the bins based on at least one of overdraw associated with the bin, blending associated with the bin, and/or a number of objects (e.g., primitives, triangles, etc.) of the target at least partially represented in the bin.

For each of the plurality of bins, then, the rendering pass configuration component 199 may compare the respective complexity value with a bin complexity threshold, which may be the same for all bins. In some aspects, the bin complexity threshold may be predetermined or preconfigured (e.g., stored in memory of the system 100, such as internal memory 121, internal memory 123, or system memory 124). In some other aspects, the rendering pass configuration component 199 may determine (e.g., compute, calculate, estimate) the bin complexity threshold. For example, the rendering pass configuration component 199 may determine the bin complexity threshold based on the configuration(s) of the system 100 (e.g., the characteristics and/or capabilities of the system 100).

Illustratively, the rendering pass configuration component 199 may determine the bin complexity threshold based on the configuration(s) of the system 100 with respect to overdraw, blending, and/or objects (e.g., primitives, triangles, etc.), such as the capabilities of the system 100 and/or the latency commensurate with rendering by the system 100 with respect to amounts of overdraw, amounts of blending, and/or amounts of objects to be rendered.

Accordingly, for each of the plurality of bins, the rendering pass configuration component 199 may compare a respective complexity value with the bin complexity threshold, and based on the comparison, the rendering pass configuration component 199 may configure (e.g., sort, determine, identify) a bin in either the first subset of the plurality of bins or the second subset of the plurality of bins, with the first subset being configured for rendering into the GMEM and the second subset being configured for rendering (directly) into the system memory 124 without rendering into the GMEM.

In some aspects, the rendering pass configuration component 199 may configure a bin in the first subset when the respective complexity value of the bin satisfies (e.g., meets or exceeds) the bin complexity threshold. That is, the rendering pass configuration component 199 may determine the bin should be rendered into GMEM when the bin represents a relatively more complex region of the target, such as a region having a relatively greater amount of overdraw, blending, and/or objects to be rendered.

Complementarily, the rendering pass configuration component 199 may configure a bin in the second subset when the respective complexity value of the bin fails to satisfy (e.g., is less than) the bin complexity threshold. That is, the rendering pass configuration component 199 may determine the bin should be rendered into the system memory 124 without rendering into the GMEM when the bin represents a relatively less complex region of the target, such as a region having a relatively lesser amount of overdraw, blending, and/or objects to be rendered.

Thus, the rendering mode selection component 198 and the rendering pass configuration component 199 may configure the process of rendering a target at two levels: (1) the full frame; and (2) each bin. At the full frame level, the rendering mode selection component 198 may determine whether to render the target directly into the system memory 124 (e.g., as a single bin) or to render each of a plurality of bins into which the target is divided. At the bin level, the rendering pass configuration component 199 may determine, for each of the plurality of bins, whether to render a bin into the GMEM (and then resolve bin(s) in the GMEM to the system memory 124) or to render a bin directly into the system memory 124 without rendering into the GMEM. Accordingly, rendering of a target may be more efficient and/or may incur less overhead, as the rendering process may be dynamically determined for both the full-frame target and, if applicable, for the bins into which the full-frame target is divided.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
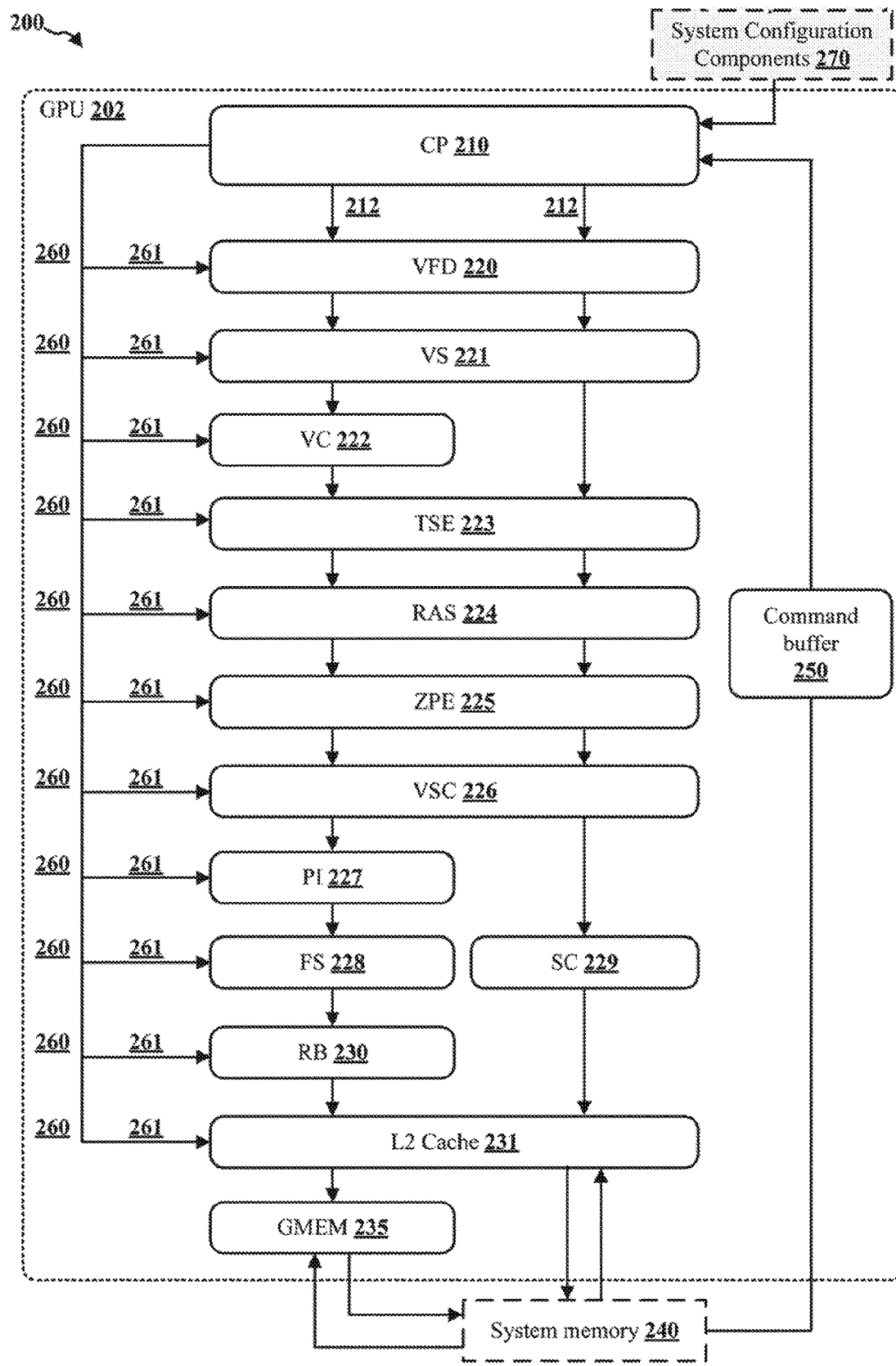
FIG. 2 illustrates an example GPU in accordance with one or more aspects of the present disclosure.

FIG. 2 illustrates an example system 200 including a GPU 202, in accordance with one or more techniques of this disclosure. As shown in FIG. 2, the GPU 202 includes command processor (CP) 210, VFD 220, VS 221, vertex cache (VC) 222, triangle setup engine (TSE) 223, rasterizer (RAS) 224, Z process engine (ZPE) 225, visibility stream compressor (VSC) 226, pixel interpolator (PI) 227, fragment shader (FS) 228, (virtually) split cache (SC) 229, render backend (RB) 230, and L2 cache 231 (e.g., UCHE). In addition, the GPU 202 may include GMEM 235, which may be on-chip memory. In some aspects, the system 200 may include system memory 240, which may be communicatively coupled with the GPU 202, e.g., via a bus and/or other wired and/or wireless connection. In some aspects, the system memory 240 may include a framebuffer.

Further, the system 200 may include one or more system configuration components 270. The GPU 202 may include and/or may be communicatively coupled with the system configuration components 270, which may include one or more components affecting (e.g., enabling, accelerating, restricting, preventing, etc.) the performance of graphics processing by the system 200. For example, the system configuration components 270 may include hardware, such as a GPU, GPU-related hardware, and/or other hardware that may be utilized during graphics processing. Each of the one or more system configuration components 270 may be configured to have characteristics and/or capabilities that positively, negatively, or neutrally affect the performance of graphics processing by the system 200, and specifically, by the GPU 202. Illustratively, the system configuration components 270 may enable some concurrent operations commensurate with graphics processing, such as concurrent resolves, concurrent unresolves, and/or concurrent clear and resolve.

The system configuration components 270 may provide information indicating one or more configurations associated with capabilities and/or characteristics of the system 200 (e.g., configurations associated with concurrent resolve(s), concurrent unresolve(s), clear operation(s) concurrent with resolve(s) and/or unresolved(s)). Being communicatively coupled thereto, the GPU 202 may obtain such information for use during graphics processing, such as for dynamic selection of a first or second rendering mode when rendering a target and/or dynamic respective selections of a first or second rendering pass type when rendering each of a plurality of bins into which a target is divided.

Although FIG. 2 displays that the GPU 202 includes components 220-231 (e.g., one or more of components 220-231 may be a processing unit), the GPU 202 can include a number of additional processing units and/or other components. Additionally, components 220-231 are merely an example and any combination and/or order of components (e.g., processing) units can be used by GPUs according to the present disclosure. For example, the GPU 202 may include GMEM 235, a frame buffer, or similar memory unit(s) configured to store an image copied between system memory 240, and/or one or more of components 220-231 may include GMEM, framebuffer, or similar memory unit(s).

The GPU 202 also includes command buffer 250, which may store draw call packets 212, context register packets 260, and/or context states 261. The command buffer 250 may pass packets and/or states to the CP 210, such as draw call packets 212, context register packets 260, and/or context states 261, one or more of which may be received in command buffer 250 from system memory 240, e.g., according to instructions from an application and/or other software and/or firmware.

As shown in FIG. 2, the GPU 202 can utilize a CP, e.g., CP 210 and/or accelerator, to perform various operations, such as by executing set(s) of instructions. The CP 210 may be implemented as hardware, software, firmware, or any combination thereof. In some aspects, the CP 210 may receive instructions as a command stream, which may result in display content representing the full-frame target. Accordingly, a command stream may include information for rendering a target. For example, a command stream may include information associated with primitives (e.g., triangles or other objects) to be rendered in the target.

In some configurations, the CP 210 may execute code to dynamically select either a first rendering mode (e.g., a bin rendering mode or a bin-level rendering mode) or a second rendering mode (e.g., a visibility direct mode) for rendering a target (e.g., scene or image) on a display. In some other configurations, when the first rendering mode is selected for the target, the CP 210 may execute code to dynamically select, for each of a plurality of bins into which the target is divided, a first rendering pass type (e.g., including rendering a respective bin into GMEM 235) or a second rendering pass type (e.g., excluding rendering a respective bin into GMEM 235) for rendering the target on a display.

In some aspects, at least one of the selection of one of the first rendering mode and the second rendering mode (e.g., at the full frame level) and/or the respective selection of one of the first rendering pass type or the second rendering pass type (e.g., at the bin level) may be implemented without hardware, e.g., implemented as software. In some other aspects, at least one of the selection of one of the first rendering mode and the second rendering mode (e.g., at the full frame level) and/or the respective selection of one of the first rendering pass type or the second rendering pass type (e.g., at the bin level) may be implemented using both software and hardware. Other implementations may also be possible without departing from the scope of the present disclosure.

The selection of a first or second rendering mode and/or respective selection of a first or second rendering pass type for each of a plurality of bins (e.g., when the first rendering mode is selected for a full-frame target) may be dynamic. In particular, the selection of a rendering mode may be performed for each frame (e.g., as opposed to carried over or inferred from a previous frame). Similarly, each selection of a respective rendering pass type may be performed for each bin into which a target is divided. As such dynamic selection of the rendering modes and/or respective rendering pass types may configure the GPU 202 with the mode and/or respective rendering pass types determined (e.g., estimated or predicted) to perform comparatively better (e.g., incur less overhead, consume less power), performance improvements may be experienced by the GPU 202 over time (e.g., a measurable performance improvement of at least approximately 3% to 10% for some applications providing images/scenes to be rendered).

In some further aspects, selection of a first or second rendering mode and/or respective selection of a first or second rendering pass type for each of a plurality of bins (e.g., when the first rendering mode is selected for a full-frame target) may be triggered by a change in the source of render targets, such as a change in application, a change in an active (e.g., in-focus) frame, and/or other similar change. For example, the system 200 may be configured to use a particular rendering mode and/or rendering pass type in some instances, but then may be triggered to dynamically select a first or second rendering mode and/or dynamically select a first or second rendering pass type in response to a triggering condition, such as a rendering frame layout and/or heuristics.

In some aspects, the CP 210 may be configured to parse the command buffer 250 into context register packets (e.g., context register packets 260) and/or draw call data packets (e.g., draw call packets 212). The CP 210 can then send the context register packets 260 or draw call data packets 212 through (separate) paths to the components 220-231 (e.g., processing units or blocks) in the GPU 202. Further, the command buffer 250 can alternate different states of context registers and draw calls. For example, the command buffer 250 can be structured in the following manner: context register of context N, draw call(s) of context N, context register of context N+1, and draw call(s) of context N+1, and so forth.

The GPU 202 may be configured to render a full-frame target (e.g., image, scene, etc.) in at least two different ways. In particular, the GPU 202 may be configured to render a target using at least rendering or tiled rendering, which may be referred to in the present disclosure as the first rendering mode. In some aspects, the first rendering mode may include a "visibility bin rendering mode" or "bin rendering mode." When the GPU 202 is configured in such the first rendering mode, a target (e.g., an image, a scene, a frame, etc.) can be divided or separated into different sections or tiles. After the division of the target, each section or tile can be rendered separately. According to the first rendering mode, the GPU 202 can divide the target (e.g., computer graphics image) into a grid format, such that each portion of the grid (e.g., a tile) is separately rendered. In some aspects, during a binning pass, a target can be divided into different bins or tiles. Moreover, in the binning pass, different primitives (e.g., triangles) can be shaded in certain bins, e.g., using draw calls.

In some aspects, during the binning pass, depth information may be computed (e.g., using ZPE 225), which may indicate one or more depths of one or more pixels (e.g., a closest pixel, a furthest pixel, etc.) in a certain block or section of the target. The section may be of a different size (e.g., smaller) than the size of each bin—e.g., each bin may include multiple sections over which depth information may be computed. As the depth information may be derived over a section (e.g., 8 pixels×8 pixels, 32 pixels×32 pixels, or other pixel dimension(s)) rather than pixel-level depth testing, the depth information may be referred to as low-resolution Z (LRZ) information. The LRZ information may be stored into an LRZ buffer, e.g., for each bin.

In some aspects, during a binning pass, a visibility stream can be constructed where visible primitives (e.g., triangles and/or other objects) and/or draw calls can be identified. Additionally or alternatively, during a binning pass (or other processing of primitives, a visibility of primitives may be determined, e.g., for each bin based on input primitives included in a command stream associated with the target. For example, the VFD 220 may determine some position data associated with a set of vertices (e.g., vertices of one or more primitives, such as primitives visible in a respective bin). The VS 221 may process the vertex position data of each bin, e.g., as obtained from VFD 220. Potentially, the VC 222 may store (e.g., cache) some vertex position data and/or calculations from the VS 221 in order to determine visibility of primitives for each bin and/or facilitate construction of the visibility stream for each bin, e.g., during the binning pass. A respective bin may be processed through a stream compressor (e.g., VSC 226), which may use source pixels associated with a rasterized primitives in order to generate a respective visibility stream for each bin. In some aspects, a visibility stream may be generated via a stream compressor, e.g., based on a respective bin corresponding thereto based on primitive, rasterization, vertex, depth, and/ or other information obtained from the VFD 220, VS 221, VC 222, TSE 223, RAS 224, and/or ZPE 225.

In some additional or alternative aspects, the visibility of primitives with respect to each bin may be determined, which may be based on sorting primitives into bins according to visibility of primitives within each bin or based on a respective visibility stream corresponding to each bin. In some implementations, the visibility of primitives with respect to each bin may be determined based on primitive, rasterization, vertex, depth, and/or other information obtained from the VFD 220, VS 221, VC 222, TSE 223, RAS 224, and/or ZPE 225. For example, a command stream may include processing a respective subset of primitives associated with (e.g., at least partially visible in) each bin. In some configurations, a command stream may include partial vertex shading processing as part of a determination of respective subsets of primitives associated with bins, e.g., such that the post-VS position(s) of a respective subset of primitives is produced for use in per-bin processing.

In some aspects, the GPU 202 can apply the drawing or rendering process to different bins or tiles. For instance, the GPU 202 can render to one bin, and then perform all the draws for the primitives or pixels in the bin. Further, the GPU 202 can render to another bin, and perform the draws for the primitives or pixels in that bin. Therefore, in some aspects, there might be a small number of bins X, e.g., X bins may be four or six bins, that cover all of the draws in one surface. Further, the GPU 202 can cycle through all of the draws in one bin, but perform the draws for the draw calls that are visible, e.g., draw calls that include visible geometry. In some aspects, a visibility stream can be generated, e.g., in a visibility pass and/or binning pass, to determine the visibility information of each primitive in a target (e.g., an image or scene). For instance, this visibility stream can identify whether a certain primitive is visible or not. In some aspects, this information can be used to remove primitives that are not visible, e.g., in the rendering pass. Also, at least some of the primitives that are identified as visible can be rendered in the rendering pass.

In some aspects of first rendering mode, there can be multiple processing phases or passes. For instance, the rendering can be performed in at least two passes, e.g., a visibility or bin-visibility pass and a rendering or bin-rendering pass. During a visibility pass, the GPU 202 can input a rendering workload, record the positions of the primitives or triangles, and then determine which primitives or triangles fall into which bin or area. In some aspects of a visibility pass, the GPU 202 can also identify or mark the visibility of each primitive or triangle in a visibility stream.

During a rendering pass, the GPU 202 can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, the GPU 202 can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, the GPU 202 may determine or write visibility information of each primitives in each bin or area, e.g., in a system memory 240. This visibility information can be used to determine or generate a visibility stream.

In a rendering pass, the primitives in each bin can be rendered separately. In these instances, the visibility stream can be fetched from memory used to drop primitives which are not visible for that bin. In some aspects, each bin is separately rendered in GMEM 235, e.g., until all bins have been rendered in GMEM 235 and so the entire image is in GMEM 235. The image may then be resolved (stored) from GMEM 235 to system memory 240—e.g., the image may be stored in system memory 240 by copying the image from GMEM 235. Specifically, once all (visible) primitives or triangles are completely rendered in GMEM 235, data corresponding to each bin rendered in GMEM 235 may be stored in a respective corresponding region of a framebuffer of GMEM 235. According to various aspects, a "resolve" may be additionally or alternatively referred to as a "store," a "GMEM to system memory copy [of bin(s)]," or other terminology of the same or similar effect.

(In some instances, the first rendering mode may include one or more unresolves loads), which may be complementary to resolves (stores) executed to render an image first into GMEM 235 and then copy into system memory 240. According to various aspects, an "unresolve" may be additionally or alternatively referred to as a "load," a "system memory to GMEM copy [of bin(s)]," or other terminology of the same or similar effect.

To render an image based on another (e.g., previous image) in the first rendering mode, one subset of the plurality of bins may be changed while a different subset of the plurality of bins may remain unchanged. To do so, the full image (e.g., all of the plurality of bins) may be unresolved (loaded) from system memory 240 into GMEM 235, and then the changed bins may be rendered into GMEM 235 while the unchanged bins may remain unchanged in GMEM 235. Subsequently, all bins in GMEM 235 may be resolved to system memory 240. Specifically, data of each bin in GMEM 235 may be copied to a respective region in the framebuffer of system memory 240, with each region corresponding to a respective bin into which the image is divided.

According to some aspects, at least two rendering passes may be performed for the plurality of bin into which a target is divided. GPUs or GPU architectures (e.g., the GPU 202) may configure each of the plurality of bins into one of a first subset of bins or a second subset of bins, with the first subset of bins being rendered according to the first rendering pass type and the second subset of bins being rendered according to the second rendering pass type. For a rendering pass of the first type, bins of the first subset may be rendered as aforementioned, in that each of the bins may be rendered into GMEM 235 and then all of the bins in GMEM 235 may be resolved to system memory 240.

For a rendering pass of the second type, however, bins of the second subset may be directly rendered into system memory 240, without rendering into GMEM 235. The second subset of bins may be directly rendered into system memory 240 in a single rendering pass. A bin mask may be used to render the second subset of bins into system memory 240 for early Z rejection. For example, the bin mask may be based on an internal depth buffer, which may be generated according to ZPE 225. The bin mask may cause some data (e.g., pixel data) of certain depths to be rejected or dropped, e.g., so that such data (e.g., pixel data) may not be rendered, such as when pixels of certain depths are occluded and/or are not visible in display content when output on a display.

In some aspects, the first-type rendering pass may be performed before the second-type rendering pass. For example, the first subset of bins may first be rendered into GMEM 235 and, once rendered into GMEM 235, may be resolved into system memory 240; subsequently, the second subset of bins may be rendered into system memory 240 in a single rendering pass for all of the second subset of bins.

In addition to first rendering mode, e.g., in which a target is rendered at a bin level, GPUs or GPU architectures (e.g., the GPU 202) of the present disclosure may be further configured with a second rendering mode for rendering a full-frame target—e.g., the second rendering mode may be referred to as a visibility direct mode. According to some implementations, the visibility direct mode may be considered a primarily software-based rendering mode. However, rendering into GMEM 235 (and then resolving into system memory 240), as with the bin rendering mode and the first rendering pass type, may be considered to be a primarily hardware-based rendering mode.

For rendering in the second rendering mode (e.g., visibility direct mode), a driver or CPU can replicate an entire frame geometry by processing each view one time. Additionally, some different states may be changed depending on the view. As such, in visibility direct mode, the software can replicate the entire workload by changing some states that may be utilized to render for each viewpoint in an image.

In certain aspects, as the GPU 202 may be submitting the same workload multiple times for each viewpoint in a target, there may be an increased amount of overhead. By contrast, with the bin rendering mode, the GPU 202 and/or other hardware may be responsible for replicating or processing the geometry for each viewpoint in a target. Accordingly, the GPU 202 and/or other hardware can manage the replication or processing of the primitives or triangles for each viewpoint in a target.

According to visibility direct mode, a target (e.g., an image) may be directly rendered into system memory 240, e.g., as an entire frame geometry is replicated through processing one view. Thus, rendering multiple bins or tiles into GMEM 235 to store the full image in GMEM 235 may be avoided. Rather, a full-frame target, e.g., an entire image or full-frame geometry, may be processed as a whole, as opposed to separating the target into a plurality of bins (e.g., X bins) that each correspond to a discrete section of the full-frame image.

Potentially, an LRZ buffer may be based on a visibility pass (and/or binning pass) for the single bin in the visibility direct mode. The LRZ buffer may include information indicating a number of visible pixels in the full-frame target. For example, the ZPE 225 may generate LRZ information indicating full-frame visible pixels in the full-frame target for the VSC 226.

However, the full-frame target may be treated as a single bin for visibility direct mode. One visibility stream (e.g., a full-frame visibility stream) may be constructed for the single bin corresponding to the full-frame target. As the full-frame target may be processed as a single bin, the full-frame visibility stream may include information identifying the visible primitives or triangles in the full-frame target, as well as draw calls associated with the full-frame target. In some aspects, a stream compressor (e.g., VSC 226) may be configured for the full-frame target for the visibility direct mode.

Potentially, the overhead associated with the GPU 202 generating the full-frame visibility stream for the single bin corresponding to the target may be "hidden" by the overhead incurred by one or more parallel operations, such as one or more current or previous rendering passes performed for each of the plurality of bins corresponding to a respective one of the sections into which the target is divided. For example, the overhead incurred by a full-frame visibility pass for the single bin corresponding to the target may be entirely covered in time by the GPU 202 processing a rendering pass for each of the plurality of bins corresponding to a respective one of the sections into which the target is divided, such as rendering passes for the plurality of bins behind the full-frame visibility pass and/or (previous) rendering passes for the plurality of bins parallel with the full-frame visibility pass.

Referring again to FIG. 2, in some aspects of the GPU 202, the CP 210 may be configured to select between the first rendering mode (e.g., bin rendering mode or bin-level rendering mode) and the second rendering mode (e.g., visibility direct mode). In some further aspects, the CP 210 may be configured to select between a first rendering pass type (e.g., including rendering into GMEM 235) and a second rendering pass type (e.g., excluding rendering into GMEM 235), for example, when the first rendering mode is selected. The CP 210 may dynamically perform such selections and/or determinations, e.g., based on data and/or packets in the GPU pipeline, based on a context and/or a change in context, and the like. The CP 210 may select one of the two modes (and, if applicable, one of two rendering pass types), e.g., based on a set of conditions associated with one or more of the visibility streams, LRZ buffer, system configuration components 270, and/or other conditions/parameters.

The configuration(s) for selections between first and second rendering modes and/or first and second rendering pass types may be structured as at least one command stream composed of a set of commands (e.g., including instructions and/or operations) that configure the CP 210 to operate in one of the first or second rendering modes and, if applicable, one of the first or second rendering pass types. For example, the command stream may be stored in the command buffer 250, and commands may be issued therefrom to the CP 210. In effect, configuration of the GPU 202 to dynamically switch between first and second rendering modes (and, potentially, dynamically switch between first and second rendering pass types) may circumvent a CPU and/or other processing separate from the GPU 202, which may reduce overhead on the CPU and/or other processing unit(s) in a device in which the GPU 202 is implemented.

Initially, for example, the command stream may include a set of commands for determining (e.g., detecting, computing, etc.) a set of conditions (e.g., parameters, factors, variables, etc.) associated with, or otherwise affecting, rendering one or more targets. For example, the set of conditions may be based on one or more of: (1) a plurality of visibility streams respectively corresponding to the plurality of bins (e.g., X bins) into which the target is divided; (2) a single visibility stream respectively corresponding to a single bin corresponding to the target; (3) at least one depth buffer indicating a set of visible pixels in at least one section of the target (e.g., a section of the target may include a block of pixels of certain dimension(s)); (4) hardware and/or software capabilities associated with rendering the target; and/or (5) other condition(s) associated with rendering the target.

The command stream may include a set of commands configuring the CP 210 to perform a set of visibility passes (and/or binning passes) for the target. In some aspects, the CP 210 may obtain a set of LRZ information, e.g., in at least one LRZ buffer, that each corresponds to at least one of the X+1 bins based on performing the set of visibility passes (and/or binning passes). For the first rendering mode, the CP 210 may obtain LRZ information for each of the plurality of bins into which the target is divided. For the second rendering mode, the CP 210 may obtain LRZ information for the single bin corresponding to the target.

In some other aspects, the CP 210 may obtain a set of visibility streams that each corresponds to at least one bin of a target (e.g., full-frame image or full-frame scene) based on performing the set of visibility passes (and/or binning passes). For the first rendering mode, the CP 210 may perform a plurality of visibility passes for each of the plurality of bins into which the target is divided (e.g., X visibility passes for each of the X bins). For the second rendering mode, the CP 210 may perform a single visibility pass for the single bin corresponding to the target (e.g., one visibility pass for the single bin corresponding to the target).

The CP 210 may then obtain visibility streams for each of the plurality of bins corresponding to a portion of the target and/or the single bin corresponding to the target. According to some aspects, a target may be divided into X bins, and therefore, the CP 210 may obtain X+1 visibility streams for the X bins and the single bin corresponding to the target. Additionally or alternatively, the CP 210 may obtain LRZ information corresponding to the target based on at least one of the X+1 visibility passes (or binning passes). That is, the CP 210 may obtain low-resolution pixel depths for each of the X bins and/or for the single bin corresponding to the target. For example, the CP 210 may obtain a number of visible pixels in the target, after obtaining LRZ information (e.g., a number of pixels depths, which may be over a specific section for a lower resolution than a pixel-level resolution), for VSC 226.

The command stream may be configured to cause the CP 210 to select one of the first or second rendering modes, e.g., as a function of a set of conditions, which may be given by at least one of overhead(s), workload(s), capabilities (e.g., including limitations) on system configuration components 270, calculations, and the like, which may have a direct or tangential effect on rendering the target. In some configurations, the set of conditions may be based at least one LRZ buffer and/or at least one of the X+1 visibility streams. In some other configurations, the set of conditions may be based on the system configuration components 270, such as the capabilities (e.g., limitations) of the system configuration components 270 to perform various operations for rendering the target.

A non-limiting list of some example operations may include, inter alia, blending, clearing (e.g., setting all pixel color values to a default value, such as clear or white), resolving or storing, unresolving or loading, detecting overdraw, and the like. Further, some example operations may be concurrent—e.g., concurrent resolves and/or unresolves, concurrent resolves and/or clear-on-stores. Such concurrent operations may occur when at least two bins of the X bins are concurrently stored, loaded, cleared, or otherwise used.

By way of illustration, concurrent resolves may include concurrently resolving, from GMEM 235 to system memory 240, at least two bins of the X bins, such as concurrently resolving bin(n) and bin(m) of [bin(0), bin(1), bin(2), . . . , bin(X−1)], where 0≤m≤X−1, 0≤n≤X−1, and m≠n. By way of another illustration, concurrent clear-on-store may include concurrently storing (resolving) bin(n) from GMEM 235 to system memory 240 and clearing bin(m) of the X bins, which may reduce the overhead associated with clearing bin(m) (e.g., the overhead associated with clearing bin(m) may be "hidden" by the overhead associated with storing (resolving) bin(n) from GMEM 235 to system memory 240). As a further illustration, concurrent resolve and unresolve may include concurrently resolving bin(n) from GMEM 235 to system memory 240 and unresolving bin(m) from system memory 240 to GMEM 235. In still another illustration, concurrent unresolves may include concurrently unresolving, from system memory 240 to GMEM 235, at least two bins of the X bins, such as concurrently unresolving bin(n) and bin(m).

Thus, the CP 210 may determine (e.g., compute, estimate, etc.) one or more conditions associated with: (1) resolves or stores; (2) unresolves or loads; (3) blending; (4) overdraw; and/or (5) another operation commensurate with rendering the target. In some configurations, one or more conditions may be based on overhead, which may represent an amount and/or frequency of operations (e.g., instruction cycles), a memory overhead incurred due to operation(s), a power overhead incurred due to operation(s), a processor overhead incurred due to operation(s), and/or another metric via which consumption of one or more resources (e.g., power, processor, memory, and/or other computational resource) may be evaluated.

For example, a condition may be determined based on comparison of an overhead with a corresponding threshold, such as a preconfigured threshold or a tunable/configurable threshold that may be dynamically adjusted based on the target and/or a source of the target (e.g., an application). Illustratively, if an overhead is fails to satisfy (e.g., is greater than or equal to) a corresponding threshold, then the overhead may be considered to be inefficient, which may be weighed in favor of the other mode (e.g., second rendering mode) by the CP 210. Otherwise, if the overhead satisfies (e.g., is less than) the corresponding threshold, then the overhead may be considered to be efficient, which may be weighed in favor of the associated mode (e.g., first rendering mode) by the CP 210.

In some other configurations, one or more conditions may be based on one or more capabilities of system configuration components 270 to execute one or more operations commensurate with the bin rendering or visibility direct modes. As hardware components may vary across devices, some devices implementing the GPU 202 may include various hardware components with capabilities insufficient to meet minimum performance expectations for rendering images using one of the bin rendering or visibility direct modes, or constrained by limited capabilities effectively preventing execution of some operations necessary for efficiently rendering images using one of the bin rendering or visibility direct modes. Therefore, the CP 210 may determine one or more conditions whether the system configuration components 270 are capable of satisfactorily performing one or more operations associated with one of the bin rendering or visibility direct modes, and the CP 210 may consider such hardware-related conditions when selecting between the bin rendering and visibility direct modes.

In one aspect, the CP 210 may determine at least one overhead associated with resolves or stores commensurate with the X visibility streams associated with the first rendering mode. The CP 210 may determine (e.g., estimate, compute, etc.) the overhead upon the GPU 202 and/or system configuration components 270 in order to resolve or store some or all of the X bins rendered into GMEM 235 from GMEM 235 to system memory 240. Potentially, the resolves or stores may be associated with depth information (e.g., a number of pixel depths) of one or more of the X bins into which the target may be divided. For example, the resolves or stores from GMEM 235 to system memory 240 may be based on one or more LRZ buffers associated with the plurality of bins into which the target is divided, which may be obtained based on the visibility passes (or binning passes) performed for the plurality of bins.

The CP 210 may determine (e.g., estimate, compute, etc.) the overhead upon the GPU 202 and/or system configuration components 270 for the resolves or stores from GMEM 235 into system memory 240 incurred when rendering the at least a portion of the target. The overhead of resolves or stores (e.g., time determined/estimated to be incurred for resolves or stores), or the number of resolves or stores, may be compared with at least one resolve/store threshold.

Such a condition associated with resolves or stores may indicate the second rendering mode should be selected by the CP 210 when the overhead (or number) satisfies (e.g., is greater than or equal to) the at least one resolve/store threshold (e.g., as the visibility direct mode may incur lower overhead, may be more efficient, etc.). However, such a condition associated with resolves or stores may indicate the first rendering mode should be selected by the CP 210 when the overhead of resolves or stores, or the number of resolves or stores, fails to satisfy (e.g., is less than) the at least one resolve/store threshold.

In another aspect, the CP 210 may determine a condition of unresolves or loads associated with rendering the target— e.g., such a condition may be based on at least one overhead associated with unresolves or loads commensurate with the X visibility streams associated with the first rendering mode. One or more unresolves or stores may be performed when modifying one or more tiles from the existing contents (e.g., a previous image) of system memory 240 in order to render the target in GMEM 235, e.g., as opposed to clearing system memory 240 and/or GMEM 235 in order to render the full-frame target from scratch. Potentially, the number of unresolves or loads may affect the number of resolves or stores, e.g., as only those bins being modified in GMEM 235 may be resolved or stored from GMEM 235 into system memory 240 after unresolving or loading contents (e.g., a previous target) of system memory 240 into GMEM 235.

According to one configuration, the unresolves or loads may be associated with color. For example, the unresolves or loads may be associated with one or more modifications to one or more colors over one or more bins. At least one overhead for at least one unresolve or load may be determined based on a number of pixel colors for each of the X bins of a target and/or a number of pixel colors for each of the X bins modified from the contents of system memory 240.

According to another configuration, the unresolves or loads may be associated with depth. For example, the unresolves or loads may be associated with one or more modifications to one or more pixel depths (e.g., low-resolution pixel depths) over one or more bins. At least one overhead for at least one unresolve or load may be determined based on a number of pixel depths for each of the X bins of a target and/or a number of pixel depths for each of the X bins modified from the contents of system memory 240. As such depth information may be given by LRZ buffer(s), the depth unresolves or loads may be based on LRZ buffer(s), e.g., obtained from each of the X visibility passes (or binning passes).

The CP 210 may determine (e.g., estimate, compute, etc.) the overhead upon the GPU 202 and/or system configuration components 270 for the unresolves or loads from system memory 240 into GMEM 235 incurred when rendering the target. The overhead of unresolves or loads (e.g., time determined/estimated to be incurred for unresolves or loads), or the number of unresolves or loads, may be compared with at least one unresolve/load threshold.

Such a condition of the overhead of unresolves or loads (and/or number of unresolves or loads) satisfying (e.g., being greater than or equal to) the at least one unresolve/load threshold may indicate the second rendering mode should be selected by the CP 210 (e.g., as the visibility direct mode may incur lower overhead, may be more efficient, etc.). However, such a condition of the overhead of unresolves or loads, or the number of unresolves or loads, not satisfying (e.g., being less than) the at least one unresolve/load threshold may indicate the first rendering mode should be selected by the CP 210.

In still another aspect, the CP 210 may determine at least one condition based on blending and/or the overhead associated therewith. According to one configuration, the CP 210 may determine whether or not blending is enabled, e.g., for rendering at least one of the X bins. According to another configuration, the CP 210 may determine the overhead upon the GPU 202 and/or system configuration components 270 based on a number of the X bins in which blending is enabled, based on a number of primitives (e.g., triangles) that are blended in one or more of the X bins, and/or based on a number of draws (e.g., a number of draw call packets 212) that indicate blending is enabled. For example, the CP 210 may compare at least one blending threshold with at least one of a number of primitives (e.g., triangles) that are blended, a ratio of the number of primitives that are blended to a number of primitives that are not blended, a number of the X bins in which blending is enabled, a ratio of the number of the X bins in which blending is enabled to a number of the X bins in which blending is disabled, a number of draws in which blending is enabled, and/or a ratio of a number of draws in which blending is enabled to a number of draws in which blending is disabled.

According to some device and/or GPU configurations, blending may be better suited (e.g., may incur less overhead, may be more efficient, etc.) to a bin-by-bin rendering (e.g., as with the bin rendering mode or rendering passes for the first and second subsets of bins) rather than directly rendering a full-frame target (e.g., as with the visibility direct mode). Therefore, a condition of blending being enabled, or a condition of a number or ratio associated with blending being enabled in a number of primitives, bins, and/or draws satisfying (e.g., being greater than or equal to) at least one blending threshold, may indicate that the first rendering mode should be selected by the CP 210 (e.g., as the visibility direct mode may incur more overhead, may be less efficient, etc.) when rendering the target. However, a condition of blending being disabled, or a condition of a number or ratio associated with blending being disabled in a number of primitives, bins, and/or draws not satisfying (e.g., being less than) at least one blending threshold, may indicate that the second rendering mode (e.g., the visibility direct mode) should be selected by the CP 210.

In a further aspect, the CP 210 may determine at least one condition based on overdraw and/or the overhead associated therewith. In some instances, overdraw may occur when a pixel is rendered multiple times, such as when two or more primitives are rendered in the same or overlapping position of a scene or image. Overdraw may incur potentially inefficient or deleterious overhead, e.g., as only the nearest pixel or topmost primitive may be visible in the scene or image, rendering a pixel more than once (e.g., for a bottommost primitive and/or furthest pixel) may be unnecessary and/or may cause add unnecessary rendering to a pixel that may distort pixel color. Accordingly, the CP 210 may detect overdraw.

In some configurations, the CP 210 may detect overdraw by determining the quotient of a number of visible pixels divided by a total number of pixels that are to be drawn. For example, the CP 210 may determine the number of full-frame visible pixels after determining (low-resolution) pixel depths (e.g., using ZPE 225) for VSC 226. The CP 210 may compare the quotient to an overdraw threshold.

A condition of high overdraw may be determined or detected when the quotient satisfies (e.g., is greater than or equal to) the overdraw threshold, whereas a condition of low or no overdraw may be determined or detected when the quotient fails to satisfy (e.g., is less than) the overdraw threshold. A condition of high overdraw may indicate the CP 210 should select the first rendering mode (e.g., as high overdraw may be associated with greater complexity, the bin rendering mode or bin-by-bin rendering may be more efficient and/or incur less overhead than the visibility direct mode). However, a condition of low/no overdraw may indicate the CP 210 should select the second rendering mode (e.g., as the visibility direct mode may be more efficient, may incur less overhead, etc. when rendering a target with relatively lower complexity, such as low or no overdraw).

An overdraw threshold may be a preconfigured value, e.g., an overdraw threshold may be equal to 2.0. However, an overdraw threshold may be a tunable or configurable parameter, which may be modified based on the target and/or a source thereof. For example, an overdraw threshold may be dynamically adjusted based on an application according to which a target is rendered. Accordingly, the overdraw threshold may be adjusted between applications, e.g., based on the type of application, historical data associated with an application, and/or other factors associated with an application.

In yet another aspect, the CP 210 may determine at least one condition for selecting between the first and second rendering modes based on whether the system configuration components 270 are capable of (satisfactorily) performing concurrent operations associated with rendering the target. Concurrent operations may be at least two operations that are performed in parallel, such that execution of each of the two operations at least partially overlaps in time. For example, the CP 210 may concurrently execute at least two operations by sending a respective set of packets for each of the at least two operations through separate paths to the components 220-231 of the GPU 202.

In one configuration, the CP 210 may determine a condition of whether system configuration components 270 are capable of performing concurrent resolves and/or unresolves. For example, the CP 210 may determine whether system configuration components 270 are capable of concurrently resolving bin(n) and bin(m) of the X bins from GMEM 235 to system memory 240, concurrently unresolving bin(n) and bin(m) of the X bins from system memory 240 to GMEM 235, and/or concurrently resolving bin(n) and unresolving bin(m). If the CP 210 determines the condition that system configuration components 270 are incapable of concurrent resolves and/or unresolves, then the condition may indicate the CP 210 should select the second rendering mode, e.g., as the incapability of concurrent resolves and/or unresolves may cause additional overhead to be incurred when rendering the target. Otherwise, if the CP 210 determines the condition that system configuration components 270 are capable of concurrent resolves and/or unresolves, then the condition may indicate the CP 210 should select the first rendering mode.

In another configuration, the CP 210 may determine a condition of whether system configuration components 270 are capable of satisfactorily performing concurrent resolves and/or unresolves. That is, the CP 210 may determine this condition based on whether overhead associated with the concurrent resolves and/or unresolves satisfies (e.g., is less than) at least one concurrent resolve/unresolve threshold.

For example, if the CP 210 determines the condition that concurrent resolves and/or unresolves can be satisfactorily performed, such as when the overhead for concurrent resolves and/or unresolves fails to satisfy (e.g., is less than) a concurrent resolve/unresolve threshold, then the condition may indicate that the CP 210 should select the first rendering mode. However, if the CP 210 determines the condition that the overhead for concurrent resolves and/or unresolves satisfies (e.g., is greater than or equal to) a concurrent resolve/unresolve threshold or if the CP 210 determines that the concurrent resolves and/or unresolves are not fully enabled due to limitations of system configuration components 270, then the condition may indicate that the CP 210 should select the second rendering mode.

In a further configuration, the CP 210 may determine a condition of whether system configuration components 270 are capable of performing clear-on-store operation. For example, the CP 210 may determine whether system configuration components 270 are capable of concurrently resolving bin(n) of the X bins from GMEM 235 to system memory 240 and clearing bin(m). If the CP 210 determines the condition that system configuration components 270 are incapable of clear-on-store, then the condition may indicate that the CP 210 should select the second rendering mode, e.g., as the incapability for concurrent clear-on-store may cause additional overhead to be incurred when rendering the target. If the CP 210 determines the condition that system configuration components 270 are capable of clear-on-store, then the condition may indicate that the CP 210 should select the first rendering mode, e.g., as the capability for concurrent clear-on-store may reduce overhead relative to directly rendering the target.

In another configuration, the CP 210 may determine a condition for whether system configuration components 270 are capable of satisfactorily performing concurrent resolves and/or unresolves. That is, the CP 210 may determine this condition based on whether overhead associated with the concurrent resolves and/or unresolves satisfies (e.g., is less than) at least one concurrent resolve/unresolve threshold. For example, if the CP 210 determines the condition that concurrent resolves and/or unresolves can be satisfactorily performed, such as when the overhead for concurrent resolves and/or unresolves fails to satisfy (e.g., is less than) a concurrent resolve/unresolve threshold, then the condition may indicate that the CP 210 should select the first rendering mode. However, if the CP 210 determines the condition that the overhead for concurrent resolves and/or unresolves satisfies (e.g., is greater than or equal to) a concurrent resolve/unresolve threshold or if the CP 210 determines that the concurrent resolves and/or unresolves are not fully enabled due to limitations of system configuration components 270, the condition may indicate that the CP 210 should select the second rendering mode.

Accordingly, the CP 210 may select one of the first or second rendering modes based on a set of conditions, which may include one or more of the conditions described herein. For example, the CP 210 may receive a command stream from the command buffer 250 from which the CP 210 may determine the set of conditions and then select between the first rendering mode or the second rendering mode accordingly thereto. The CP 210 may include at least one algorithm (e.g., function, method, etc.) that takes the set of conditions as input(s) or parameter(s) and, upon evaluation (or execution), returns an output or result indicating either the first rendering mode or the second rendering mode should be selected. In some aspects, each of the set of conditions may be weighted the same during evaluation of the at least one algorithm. In some other aspects, each of the set of conditions may be assigned a respective weight such that evaluation of the at least one algorithm may be more likely to result in the first rendering mode or the second rendering mode based on which of the conditions are assigned greater weights and which of the conditions are assigned lower weights.

The CP 210 may then render the target using the selected one of the first rendering mode or the second rendering mode. For example, the CP 210 may be configured to parse the command buffer 250 into context register packets (e.g., context register packets 260) and/or draw call data packets (e.g., draw call packets 212), and can then send the context register packets 260 and/or draw call data packets 212 through (separate) paths to the components 220-231 according to which of the first or second rendering modes is selected. Selection of one of the first or second rendering modes may cause one or more of the components 220-231, as well as the CP 210, to be (re)configured according to the selected one of the rendering modes.

By way of one illustration, the CP 210 may configure the target to be directly rendered into system memory 240 when the second rendering mode (e.g., visibility direct mode) is selected. Consequently, the CP 210 may refrain from causing the target to be rendered in GMEM 235 when the second rendering mode is selected. Furthermore, the CP 210 may utilize the full-frame visibility stream, as well as the LRZ buffer, obtained from the full-frame visibility pass for the single bin corresponding to the target. In so doing, the performance of the GPU 202 in rendering the target in the second rendering mode may appreciably improve upon that of one or more other direct rendering modes, such as those in which images/frames/scenes are rendered directly into system memory 240 (circumventing GMEM 235) but without obtaining an visibility stream and/or LRZ buffer.

When the CP 210 selects the first rendering mode for rendering the target, the GPU 202 may be configured to (dynamically) determine how each of the X bins is to be rendered during a rendering pass. A command stream composed of a set of commands (e.g., including instructions and/or operations) may be structured to configure each of the X bins into one of the first subset of bins or the second subset of bins. The CP 210 may execute the command stream, e.g., when the first rendering mode is selected, to render each of the X bins according to the first rendering pass type (e.g., including rendering a bin into GMEM 235) or the second rendering pass type (e.g., including directly rendering a bin into system memory 240 with rendering into GMEM 235). For example, the command stream may be stored in the command buffer 250, and commands may be issued therefrom to the CP 210.

The command stream may include a set of commands for determining (e.g., detecting, computing, etc.) a set of conditions (e.g., parameters, factors, variables, etc.) associated with, or otherwise affecting, each of the X bins. For example, the set of conditions may be based on one or more of: (1) the plurality of visibility streams respectively corresponding to the X bins into which the target is divided; (2) at least one depth buffer indicating a set of visible pixels in at least one section of the target (e.g., a section of the target may include a block of pixels of certain dimension(s)); (3) hardware and/or software capabilities associated with rendering each of the X bins into which the target is divided; and/or (5) other condition(s) associated with rendering each of the X bins into which the target is divided.

The command stream may include a set of commands for determining (e.g., calculating, computing, etc.) a respective complexity value for each of the X bins. In some aspects, a respective complexity value may be determined for a respective bin of the X bins based on at least one of overdraw associated with the respective bin, blending associated with the respective bin, and/or a number of objects (e.g., primitives, triangles, etc.) of the target at least partially represented in the respective bin. In some other aspects, a respective complexity value for each of the X bins may additionally or alternatively be based on one or more of the system configuration components 270, such as whether concurrent resolves and/or concurrent clear-on-store operations are enabled by the system configuration components 270.

Thus, the CP 210 may execute the set of commands in the command stream for determining a respective complexity value for each of the X bins. The CP 210 may include at least one algorithm (e.g., function, method, etc.) that receives information associated with a bin (and/or information from the system configuration components 270) as input(s) or parameter(s) and, upon evaluation (or execution), returns an output or result indicating the complexity value. In some aspects, different information may be weighted the same during evaluation of the at least one algorithm. In some other aspects, different information may be assigned a respective weight such that evaluation of the at least one algorithm may be more likely to result in a higher or lower complexity value based on which information is assigned greater weights and which information is assigned lower weights.

In some aspects, the CP 210 may determine a respective complexity value for a respective bin of the X bins based on blending and/or the overhead associated blending in the respective bin. For example, the CP 210 may determine the respective complexity value based on a number of primitives (e.g., triangles) that are blended in the respective bin and/or based on a number of draws (e.g., a number of draw call packets 212) associated with the respective bin that indicate blending is enabled. For example, the CP 210 may determine at least one of a number of primitives (e.g., triangles) that are blended in the respective bin, a ratio of the number of primitives that are blended to a number of primitives that are not blended in the respective bin, a number of draws associated with the respective bin in which blending is enabled, and/or a ratio of a number of draws associated with the respective bin in which blending is enabled to a number of draws associated with the respective bin in which blending is disabled.

According to some device and/or GPU configurations, blending may be better suited (e.g., may incur less overhead, may be more efficient, etc.) to rendering a respective bin into GMEM 235 rather than directly rendering the respective bin into the system memory 240. Therefore, a condition associated with the respective bin of blending being enabled, or a condition associated with the respective bin of a number or ratio associated with blending being enabled in a number of primitives and/or draws satisfying (e.g., being greater than or equal to) at least one blending bin threshold, may indicate that the first rendering pass type should be selected by the CP 210 when rendering the respective bin—e.g., the respective bin should be rendered to GMEM 235 and then resolved to the system memory 240. Therefore, the CP 210 may increase the respective complexity value for the respective bin based on such conditions. For example, the CP 210 may increment the respective complexity value for the respective bin in response to blending being enabled in the respective bin and/or in response to an amount of blending and/or ratio associated with an amount of blending satisfying (e.g., being greater than or equal to) at least one blending bin threshold.

However, a condition of blending being disabled for the respective bin, or a condition of an amount of blending and/or ratio associated with an amount of blending not satisfying (e.g., being less than) at least one blending bin threshold, may indicate that the second rendering pass type should be selected by the CP 210. For example, as directly rendering a respective bin into the system memory 240 may be more efficient for lower complexity, and therefore, a bin having a relatively lower (or no) amount of blending may be directly rendered more efficiently than rendering into GMEM 235. Therefore, the CP 210 may decrease (e.g., decrement) the respective complexity value for the respective bin based on a relatively lower (or no) amount of blending associated with the respective bin.

In a further aspect, the CP 210 may determine at least one condition based on overdraw and/or the overhead associated therewith. The CP 210 may detect overdraw at a bin level, e.g., for each of the X bins into which the target is divided. Overdraw may increase the complexity commensurate with rendering a respective bin, and therefore, rendering a bin into GMEM 235 may be relatively more efficient for bins having a relatively greater amount of overdraw, whereas directly rendering a bin into the system memory 240 may be relatively more efficient for bins having a lower (or no) amount of overdraw.

The CP 210 may be configured to determine respective overdraw (and/or an amount thereof) for each bin of the X bins. For example, the CP 210 may determine overdraw for a respective bin by determining (low-resolution) pixel depths (e.g., using ZPE 225), e.g., for the respective visibility stream corresponding to the respective bin. In some aspects, the CP 210 may determine overdraw by determining the quotient or ratio of a number of visible pixels associated with a respective bin divided by a total number of pixels associated with the respective bin. However, the CP 210 may determine overdraw associated with a respective bin differently according to various aspects.

In some aspects, the CP 210 may determine a respective bin is associated with a relatively high amount of overdraw. For example, the CP 210 may compare an overdraw value indicative of an amount of overdraw associated with a respective bin to at least one overdraw bin threshold—e.g., the overdraw value may include the quotient or ratio of a number of visible pixels associated with a respective bin divided by a total number of pixels associated with the respective bin. The CP 210 may determine the respective bin is associated with a condition of high overdraw when the overdraw value (e.g., quotient or ratio of visible pixels to total pixels for the respective bin) satisfies (e.g., is greater than or equal to) the overdraw bin threshold. However, the CP 210 may determine the respective bin is associated with a condition of low (or no) overdraw when the overdraw value (e.g., quotient or ratio of visible pixels to total pixels for the respective bin) fails to satisfy (e.g., is less than) the overdraw bin threshold.

When the CP 210 determines a respective bin is associated with a condition of high overdraw, then the CP 210 may determine the respective bin is relatively more complex and, therefore, rendering the respective bin into GMEM 235 may be more efficient for the respective bin. Accordingly, the CP 210 may increase (e.g., increment) the respective complexity value associated with the respective bin. However, when the CP 210 determines a respective bin is associated with a condition of low (or no) overdraw, then the CP 210 may determine the respective bin is relatively less complex and, therefore, directly rendering the respective bin into the system memory 240 may be more efficient for the respective bin. Accordingly, the CP 210 may decrease (e.g., decrement) the respective complexity value associated with the respective bin.

In yet another aspect, the CP 210 may determine (e.g., adjust, compute, calculate) a respective complexity value for each of the X bins based on whether the system configuration components 270 are capable of (satisfactorily) performing concurrent operations associated with rendering the target. In one configuration, the CP 210 may determine each of the complexity values based on whether the system configuration components 270 are capable of performing concurrent resolves and/or unresolves. For example, the CP 210 may decrease one or more of the complexity values based on an incapability of the system configuration components 270 to perform concurrent resolves and/or unresolves. Correspondingly, the CP 210 may increase one or more of the complexity values based on a capability of the system configuration components 270 to perform concurrent resolves and/or unresolves.

In a further aspect, the CP 210 may determine (e.g., adjust, compute, calculate) a respective complexity value for each of the X bins based on whether system configuration components 270 are capable of performing clear-on-store operation. For example, the CP 210 may determine whether system configuration components 270 are capable of concurrently resolving and clearing associated with rendering one or more of the X bins. If the CP 210 determines the condition that system configuration components 270 are incapable of clear-on-store, then the CP 210 may decrease one or more of the complexity values. However, if the CP 210 determines the condition that system configuration components 270 are capable of clear-on-store, then the CP 210 may increase one or more of the complexity values.

The CP 210 may configure each of the X bins into one of the first subset associated with rendering into GMEM 235 (and then resolving to the system memory 240) or the second subset associated with directly rendering into the system memory 240 (without rendering into GMEM 235) based on the respective complexity value associated therewith. In particular, the CP 210 may compare each of the complexity values with a bin complexity threshold, and the CP 210 may determine whether to include a respective bin in the first subset of bins or the second subset of bins based on the comparison with the bin complexity threshold.

In some aspects, the bin complexity threshold may be preconfigured. In some other aspects, the bin complexity threshold may be determined, e.g., by the GPU 202 or by another processor (e.g., a CPU). Potentially, the bin complexity threshold may be determined based on the system configuration components 270. For example, the bin complexity threshold may be increased or decreased according to one or more configurations of the system configuration components 270, such as capabilities or characteristics associated with concurrent resolve(s) and/or concurrent unresolve(s) and/or concurrent clear-on-store operation(s). For example, the bin complexity threshold may be increased in response to configuration(s) of the system configuration components 270 being incapable of performing concurrent resolves and/or unresolves and/or concurrent clear-on-store operation(s). Thus, the bin complexity threshold may be decreased in response to configuration(s) of the system configuration components 270 being capable of performing concurrent resolves and/or unresolves and/or concurrent clear-on-store operation(s).

As a rendering pass that includes rendering into GMEM 235 may be more suitable for relatively higher complexity, the CP 210 may determine to include a respective bin of the X bins in the first subset in response to determining that the complexity value of the respective bin satisfies (e.g., is greater than or equal to) the bin complexity threshold based on the comparison. Directly rendering into the system memory 240 may be more suitable for relatively lower complexity, and therefore, the CP 210 may determine to include a respective bin of the X bins in the second subset in response to determining that the complexity value of the respective bin fails to satisfy (e.g., is less than) the bin complexity threshold based on the comparison.

In some aspects, the CP 210 may then perform at least one rendering pass for the first subset of bins. The at least one rendering pass for the first subset of bins may be of a first type associated with rendering into GMEM 235. Accordingly, the CP 210 may perform at least one rendering pass of the first type for the first subset of bins and, in so doing, the CP 210 may render each of the first subset of bins into GMEM 235.

Further to the at least one rendering pass of the first type, the CP 210 may then store (e.g., resolve or copy) the first subset of bins (e.g., the data corresponding to the first subset of bins) from GMEM 235 to the system memory 240. In some aspects, storing the contents of GMEM 235 (e.g., the data from the first subset of bins) to the system memory 240 may also be referred to as a "resolve pass," and therefore, the at least one rendering pass of the first type may include or may be associated with a resolve pass in which a portion of the data corresponding to the target, which is the data from the first subset of bins, is resolved from GMEM 235 to the system memory 240.

Further, the CP 210 may then perform at least one rendering pass for the second subset of bins. The at least one rendering pass for the second subset of bins may be of a second type associated with directly rendering into the system memory 240 (and refraining from rendering into GMEM 235). Accordingly, the CP 210 may perform at least one rendering pass of the second type for the second subset of bins. For example, the CP 210 may perform a single rendering pass of the second type in which the CP 210 directly renders each of the second subset of bins into the system memory 240.

In the (single) rendering pass of the second type for the second subset of bins, the CP 210 may render each of the second subset of bins using a bin mask. The CP 210 may render each of the second subset of bins using the bin mask to reject (e.g., refrain from rendering or drop) some data (e.g., pixels or other values) at certain depths, such as pixels that are not visible and/or pixels that may be rendered over with other pixels (e.g., pixels at higher depths and/or pixels that are visible). In some aspects, the bin mask may be a bitmap mask, e.g., indicating bits corresponding to a bitmap in the framebuffer of the system memory 240 that are to be masked when directly rendering bins of the second subset. The CP 210 may determine the bin mask based on an internal depth buffer (e.g., an LRZ buffer), which may be generated or determined using ZPE 225.

Thus, the CP 210 may be configured to render the first subset of bins before rendering the second subset of bins. To that end, the CP 210 may resolve the first subset of bins (e.g., the data or bits corresponding to the first subset of bins) from GMEM 235 to the system memory 240 before the rendering the second subset of bins into the system memory 240. In other words, the CP 210 may complete the at least one rendering pass of the first type (e.g., including the at least one resolve pass) before performing the (single) rendering pass of the second type.

Figure 3:
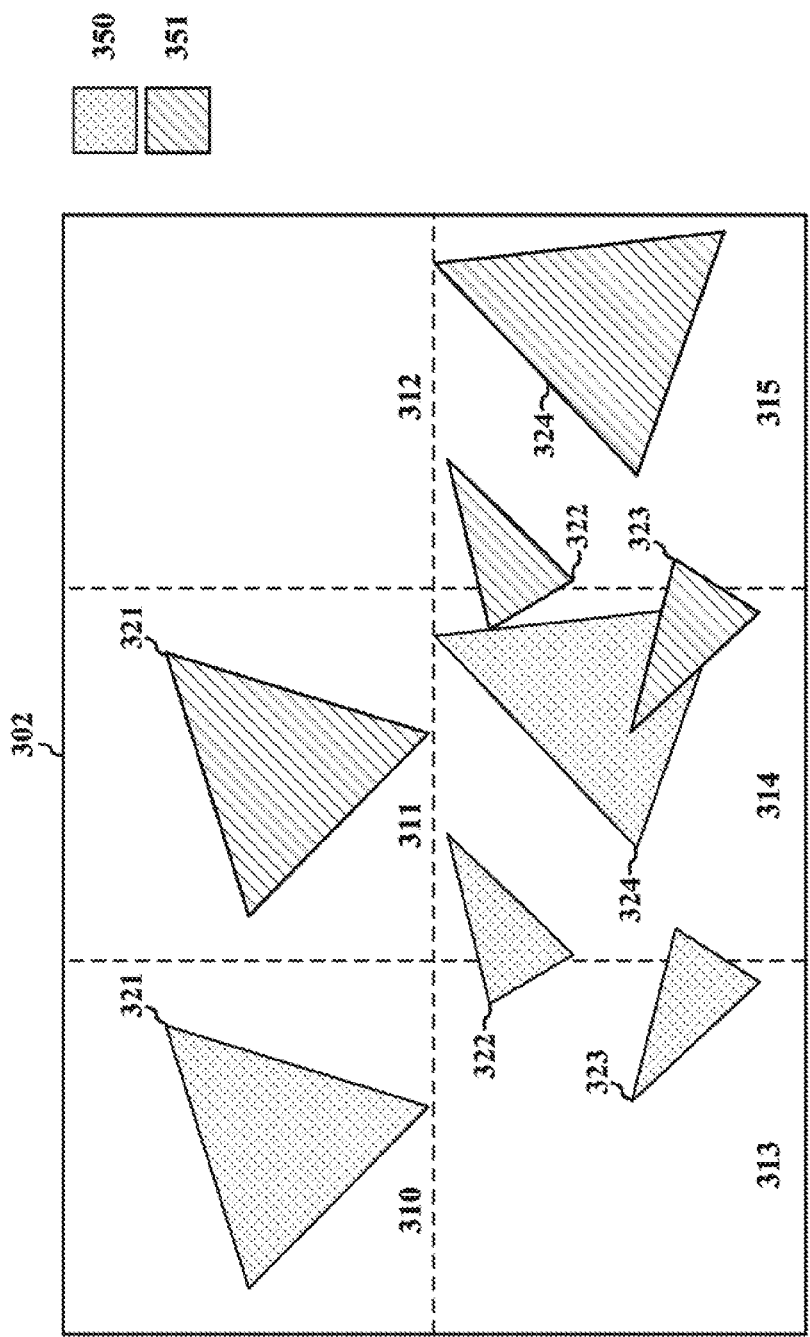
FIG. 3 illustrates an example image or surface in accordance with one or more aspects of the present disclosure.

FIG. 3 illustrates image or surface 300, including multiple primitives divided into multiple bins. As shown in FIG. 3, image or surface 300 includes a full frame 302, which may be a render target and may include primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including full frame 302 can utilize multiple viewpoints or multi-view rendering.

As indicated herein, GPUs or graphics processor units can use a multi-tiled rendering architecture, which may serve to reduce power consumption and/or save memory bandwidth in certain instances, which may be dependent upon certain type(s) and/or source(s) of image(s) being rendered. In some aspects, the multi-tiled rendering architecture may include a bin rendering mode, which may include rendering bins into GMEM before resolving into system memory. In some other aspects, the multi-tiled rendering architecture may include a bin-level determination regarding whether to render a respective bin into GMEM (before resolving into system memory) or directly render a respective bin into system memory (without rendering into GMEM).

As described herein, in tiled rendering, a full frame 302 can be divided into multiple bins 310-315 or tiles, and in some aspects, the full frame 302 may also be treated as a single bin (e.g., a single bin corresponding to the full frame 302). Multiple visibility passes may be performed with the full frame 302 and the bins 310-315 in order to generate a first visibility stream corresponding to the full frame 302 and a plurality of second visibility streams respectively corresponding to each of the bins 310-315. The first visibility stream may identify primitives 321-324 that are visible in the full frame 302, and each of the second visibility streams may identify the primitives 321-324 that are visible in a respective one of the bins 310-315.

In some aspects, at least one LRZ buffer may be populated, e.g., for each of the multiple bins 310-315. An LRZ buffer may include information indicating respective low-resolution pixel depths in each of the multiple bins 310-315. Potentially, a bin mask may be generated based on some or all of the information in an LRZ buffer, with the bin mask facilitating early Z rejection during rendering of one or more bins (e.g., a subset of the bins that are directly rendered to system memory).

With a tiled rendering architecture, the full frame 302 of image or surface 300 can then be rendered multiple times. For example, when the full frame 302 is rendered using a bin rendering mode, the full frame 302 of image or surface 300 may be rendered multiple times, e.g., once for each bin, into GMEM and then resolved therefrom into system memory.

In some implementations, however, each of the bins 310-315 may be configured into one of a first subset of bins or a second subset of bins, with a different type of rendering pass being performed for the bins of the first subset and the bins of the second subset. Each of the bins 310-315 may have a respective complexity value associated therewith. A complexity value may represent (e.g., estimate or approximate) the amount or level of complexity associated with rendering one of the bins 310-315, e.g., as the rendering process may be improved by rendering more complex bins into GMEM and then resolving the GMEM contents into system memory and rendering less complex bins directly into system memory without rendering into GMEM.

By way of illustration, the third bin 312 may be relatively less complex due to the absence of any primitives therein. For example, the third bin 312 may lack any overdraw and/or blending, which may contribute to the complexity associated with rendering a bin. Therefore, the third bin 312 may be associated with a relatively lower complexity value, which may be determined for the third bin 312 based on the absence of any primitives, overdraw, and/or blending.

Conversely, the fifth bin 314 may be relatively more complex due to the primitives 322-324 and/or the viewpoints 350-351 included therein. The fifth bin 314 may include a relatively high amount of overdraw and/or blending associated with the primitives 322-324 and/or the viewpoints 350-351 at least partially within the fifth bin 314. For example, layout of the primitives 322-324 for the viewpoints 350-351 represented in the fifth bin 314 may include some overdraw and/or blending affecting the rendering process. Accordingly, the fifth bin 314 may be associated with a relatively higher complexity value, which may be determined for the fifth bin 314 based on at least one of the primitives, overdraw, and/or blending associated with rendering the fifth bin 314.

Each of the complexity values for a respective one of the bins 310-315 may be compared with a bin complexity threshold. Based on a respective comparison, each of the bins 310-315 may be configured into one of the first subset of bins or the second subset of bins. In particular, the bins having complexity values satisfying (e.g., greater than or equal to) the bin complexity threshold may be configured into the first subset, whereas the bins having complexity values failing to satisfy (e.g., less than) the bin complexity threshold may be configured into the second subset.

In the example illustrated by FIG. 3, the third bin 312 may be associated with a relatively lower complexity value, which may fail to satisfy the bin complexity threshold. Therefore, the third bin 312 may be configured into the second subset of bins based on the failure to satisfy the bin complexity threshold, e.g., as directly rendering the third bin 312 into system memory may be more suitable in terms of latency, overhead, etc.

The fifth bin 314, however, may be associated with a relatively higher complexity value, which may satisfy the bin complexity threshold. Therefore, the fifth bin 314 may be configured into the first subset of bins based on the satisfaction of the bin complexity threshold, e.g., as rendering the fifth bin 314 into GMEM before resolving into system memory may be more suitable in terms of latency, overhead, etc.

Respective complexity values may similarly be determined for each of the remaining bins 310, 311, 313, 315. Therefore, each of the remaining bins 310, 311, 313, 315 may be configured into one of the first subset or second subset based on respective comparison of a respective complexity value with the bin complexity threshold. By way of illustration and not limitation, the fourth, fifth, and sixth bins 313-315 may be configured into the first subset, whereas the first, second, and third bins 310-312 may be configured into the second subset. Accordingly, all of the bins 310-315 into which the full frame 302 is divided may be configured into either the first subset for a first type of rendering pass or a second subset for a second type of rendering pass.

The bins 313-315 of the first subset may be rendered first, e.g., via at least one rendering pass of the first type. In the at least one first-type rendering pass, each of the fourth, fifth, and sixth bins 313-315 may be rendered into GMEM, e.g., bin-by-bin. The contents of GMEM, resulting from rendering the first subset of bins 313-315, may be resolved into system memory (e.g., according to at least one resolve pass included or associated with the at least one first-type of rendering pass). In some aspects, each of the fourth, fifth, and sixth bins 313-315 may be rendered for each of the viewpoints 350-351.

After the contents of GMEM resulting from rendering the first subset of bins 313-315 are resolved to system memory, at least one rendering pass of the second type may be performed for the second subset of bins 310-312. In some aspects, a single rendering pass of the second type may be performed to render the first, second, and third bins 310-312 directly into system memory, without rendering any of the first, second, or third bins 310-312 into GMEM.

Once all of the bins 310-315 into which the full frame 302 is divided are represented in system memory, the full frame 302 of the image or surface 300 may be output on a display. For example, contents of system memory may include a bitmap in a framebuffer, which may include display content that may be presented on a display.

Additionally, GPUs or graphics processor units can use a single-tiled rendering architecture, which may be a second rendering mode referred to as "visibility direct mode," to reduce power consumption and/or save memory bandwidth in certain other instances, which may be dependent upon certain other type(s) and/or source(s) of image(s) being rendered. This visibility direct method can treat the full frame 302 of image or surface 300 as a single bin (e.g., full frame 302), and include a visibility pass to obtain a full-frame visibility stream that corresponds to the full frame 302 and identifies the primitives 321-324 (e.g., triangles) that are visible in the full frame 302. Further, a full-frame LRZ buffer may be obtained for the full frame 302, e.g., indicating low-resolution pixel depths for the full frame 302. The full frame 302 of the image or surface 300 can then be directly rendered, e.g., once for the single bin corresponding to the full frame 302, into system memory, thereby avoiding rendering into GMEM.

GPUs and/or graphics processor units can dynamically determine whether to implement the multi-tiled rendering architecture or the single-tiled rendering architecture, e.g., for each target (e.g., frame) that is to be rendered. Further, GPUs and/or graphics processor units implementing multi-tiled rendering architecture can dynamically determine, for each of multiple bins, whether to render a respective bin into GMEM (e.g., for resolving into system memory) or directly render a respective bin into system memory (e.g., without rendering into GMEM). Such dynamic determinations by GPUs and/or graphics processor units may reduce power consumption and/or save memory bandwidth, e.g., as rendering at both the frame level and the bin level may be adapted to the complexities of different targets and bins thereof.

Figure 4:
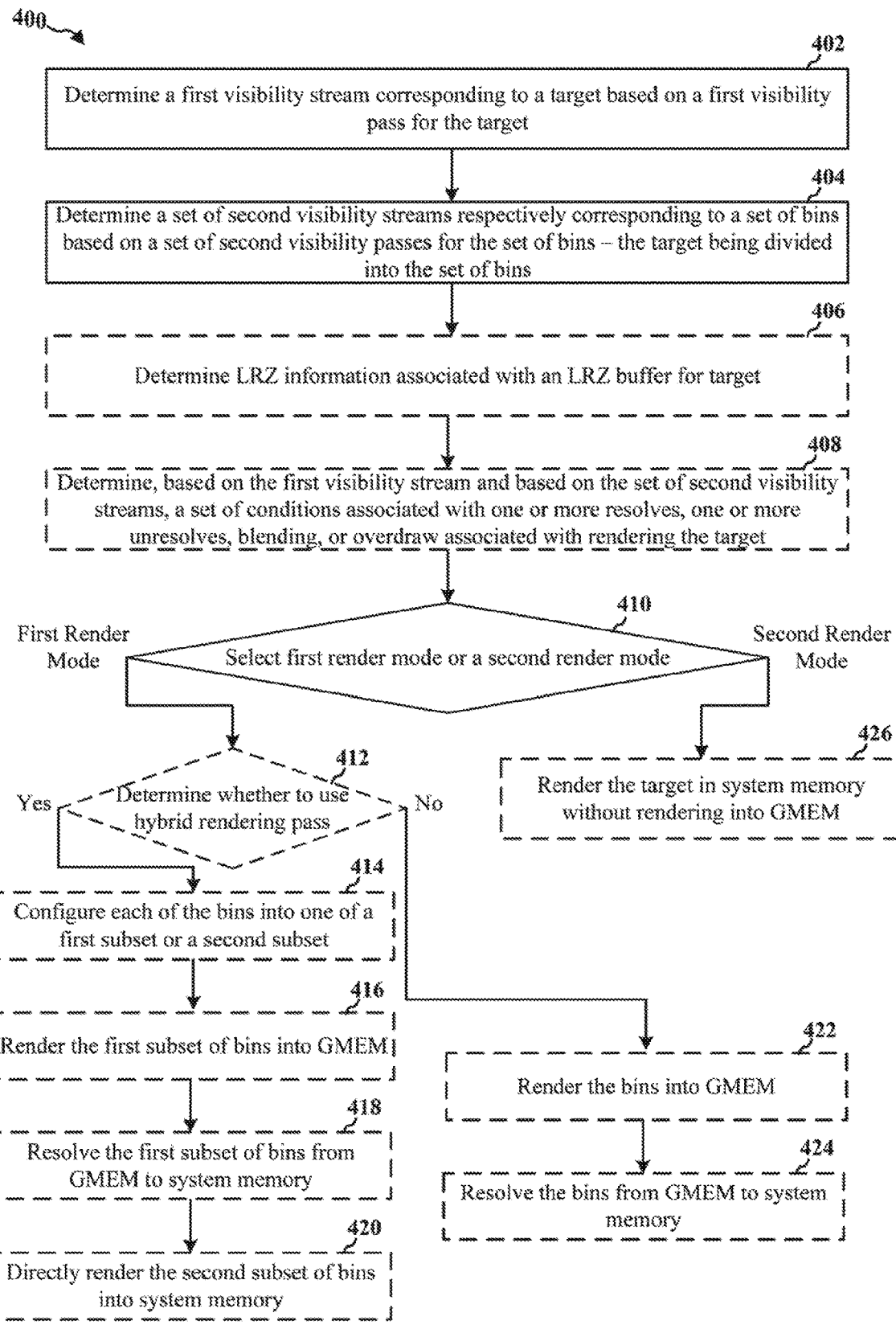
FIG. 4 illustrates an example flowchart of an example method of graphics processing in accordance with one or more aspects of the present disclosure.

FIG. 4 illustrates an example flowchart of an example method 400 in accordance with one or more aspects of the present disclosure. The method 400 may be performed by an apparatus such as a GPU, an apparatus for graphics processing, and/or one or more other processing units. In the context of FIGS. 1-3, for example, the method 400 may be performed by a system 100 and/or system 200 for rendering a full frame 302 of an image or surface 300. According to different aspects of the method 400, one or more of the illustrated blocks may be omitted, transposed, and/or contemporaneously performed.

At 402, the apparatus may determine a first visibility stream corresponding to a target (e.g., a frame, scene, image, etc.) based on a first visibility pass for the target. In some aspects, a visibility stream associated with the full-frame target, which may be viewed as a single bin, can be constructed where visible primitives (e.g., triangles) and/or draw calls can be identified. For example, the apparatus (e.g., a VFD) may determine some position data associated with a set of vertices (e.g., vertices of one or more primitives, such as primitives visible in the target). The apparatus (e.g., a VS) may process the vertex position data of the target, e.g., as obtained from VFD. The apparatus may process the full-frame target (e.g., processed as a single bin) through a stream compressor (e.g., a VSC). The apparatus (e.g., the VSC) may use source pixels associated with a rasterized primitives in order to generate the first visibility stream for the full-frame target (e.g., the single bin).

In the context of FIGS. 1 and 3, the rendering mode selection component 198 may determine a first visibility stream corresponding to the full frame 302 of the image or surface 300 based on a first visibility pass for the full frame 302 of the image or surface 300. In the context of FIGS. 2 and 3, the CP 210 may determine the first visibility stream corresponding to the full frame 302 of the image or surface 300 based on a first visibility pass for the full frame 302 of the image or surface 300. For example, the full frame 302 of the image or surface 300 and/or draw calls associated therewith may be processed through one or more of the VFD 220, VS 221, VC 222, TSE 223, RAS 224, and/or ZPE 225, e.g., for a visibility pass associated with the full frame 302 of the image or surface 300, which may facilitate generation of the first visibility stream by the VSC 226.

At 404, the apparatus may determine a set of second visibility streams respectively corresponding to a set of bins based on a set of second visibility passes for the set of bins. The target may be divided into the set of bins, e.g., X bins. In some aspects, a respective visibility stream associated each of the set of bins into which the target is divided may be constructed where visible primitives (e.g., triangles) and/or draw calls can be identified. For example, for each of the set of bins, the apparatus (e.g., a VFD) may determine respective position data associated with a respective set of vertices (e.g., vertices of one or more primitives, such as primitives visible in a respective bin). The apparatus (e.g., a VS) may process the respective vertex position data of each of the bins, e.g., as obtained from VFD. The apparatus may process each of the set of bins through a stream compressor (e.g., a VSC). The apparatus (e.g., the VSC) may use source pixels associated with a rasterized primitives in order to generate each of the second visibility streams corresponding to a respective bin of the set of bins.

In the context of FIGS. 1 and 3, the rendering mode selection component 198 may determine a set of second visibility streams corresponding to the set of bins 310-315 into which the full frame 302 of the image or surface 300 is divided based on a set of second visibility passes for set of bins 310-315. In the context of FIGS. 2 and 3, the CP 210 may determine a set of second visibility streams corresponding to the bins 310-315 into which the full frame 302 of the image or surface 300 is divided based on a set of second visibility passes for the set of bins 310-315. For example, each of the bins 310-315 and/or respective draw calls associated therewith may be processed through one or more of the VFD 220, VS 221, VC 222, TSE 223, RAS 224, and/or ZPE 225, e.g., for a respective visibility pass associated with one of the bins 310-315, which may facilitate generation of each of the set of second visibility streams by the VSC 226.

At 406, the apparatus may determine LRZ information associated with an LRZ buffer for a target (e.g., a frame, scene, image, etc.). For example, the apparatus may determine one or more pixel depths (e.g., a closest pixel, a further pixel) for one or more sections of the target, and the apparatus may store the LRZ information in the LRZ buffer. Potentially, the apparatus may determine LRZ information of an LRZ buffer for each of a plurality of bins into which the target is divided and/or for a single bin corresponding to the target. In the context of FIGS. 1 and 3, the rendering mode selection component 198 may determine LRZ information associated with an LRZ buffer for the full frame 302 of the image or surface 300. In the context of FIGS. 2 and 3, the GPU 202 (e.g., CP 210) may determine LRZ information (e.g., using ZPE 225) for each of the plurality of bins 310-315 and/or for a single bin corresponding to the full frame 302.

At 408, the apparatus may determine, based on the first visibility stream and based on the set of second visibility streams, a set of conditions associated with one or more resolves, one or more unresolves, blending, and/or overdraw associated with rendering the target. For example, the apparatus may determine or estimate a number of times the X bins rendered into GMEM are to be copied into system memory. In another example, the apparatus may determine or estimate a number of times the X bins copied into system memory are to be loaded or unresolved into GMEM in order to change at least one of the X bins in GMEM. In a further example, the apparatus may determine or estimate whether blending is enabled for the target and/or for one or more of the X bins. In still another example, the apparatus may determine or estimate an amount of overdraw associated with the target and/or associated with one or more of the X bins—e.g., the apparatus may determine a ratio of the number of visible pixels to a total number of pixels associated with rendering the target and/or rendering each of the X bins.

In the context of FIGS. 1 and 3, the rendering mode selection component 198 may determine, based on the first visibility stream and based on the set of second visibility streams, a set of conditions associated with one or more resolves, one or more unresolves, blending, and/or overdraw associated with rendering the full frame 302 of the image or surface 300. In the context of FIGS. 2 and 3, the GPU 202 (e.g., CP 210) may determine, based on the first visibility stream and based on the set of second visibility streams, a set of conditions associated with one or more resolves, one or more unresolves, blending, and/or overdraw associated with rendering the full frame 302 of the image or surface 300, which may be based on the draw call packets 212, context register packets 260, and/or context states 261 associated with rendering the X bins 310-315.

At 410, the apparatus may select one of a first rendering mode or a second rendering mode based on the first visibility stream and set of second visibility streams. The first rendering mode may include rendering each of the set of bins (e.g., multi-tiled rendering architecture), whereas the second rendering mode may include directly rendering the target (e.g., single-tiled rendering architecture). In some aspects, the apparatus may select the one of the first rendering mode of the second rendering mode further based on the determined set of conditions associated with the one or more resolves, one or more unresolves, blending, and/or overdraw associated with rendering the target. For example, the apparatus may select the one of the first rendering mode of the second rendering mode further based on at least one configuration for concurrent resolves or concurrent unresolves associated with the rendering of the target. In another example, the apparatus may select the one of the first rendering mode of the second rendering mode further based on a configuration for at least one clear operation concurrent with at least one resolve operation associated with the rendering of the target.

In some other aspects, the apparatus may select the one of the first rendering mode of the second rendering mode further based on the LRZ information associated with the LRZ buffer. For example, the LRZ information may include one or more values that (still) indicate "clear," which may reflect that no visible pixels are being written to a section (or block); the selection of the one of the first rendering mode or the second rendering mode may then be based on a ratio of the number of visible pixels to a total number of pixels associated with rendering of the target (e.g., in the section or block, as defined for the LRZ buffer).

In the context of FIGS. 1 and 3, the rendering mode selection component 198 may select one of a first rendering mode or a second rendering mode based on the first visibility stream and set of second visibility streams, with the first rendering mode including rendering each of the set of bins 310-315 (e.g., multi-tiled rendering architecture), and the second rendering mode including directly rendering the full frame 302 of the image or surface 300 (e.g., single-tiled rendering architecture). In the context of FIGS. 2 and 3, the GPU 202 (e.g., CP 210) may select one of a first rendering mode or a second rendering mode based on the first visibility stream and set of second visibility streams, with the first rendering mode including rendering each of the set of bins 310-315 (e.g., multi-tiled rendering architecture), and the second rendering mode including directly rendering the full frame 302 of the image or surface 300 (e.g., single-tiled rendering architecture). The bin rendering mode may be associated with the set of bins being the multiple X bins 310-315 that each corresponds to a respective section of the full frame 302, whereas the visibility direct mode may be associated with the set of bins being a single bin corresponding to the full frame 302.

If, at 410, the apparatus selects the first rendering mode for rendering the target:

At 412, the apparatus determine whether to use a hybrid rendering pass. When the apparatus determines not to use the hybrid rendering pass, the apparatus may determine to use a rendering pass according to the bin rendering mode. In some aspects, the apparatus may determine whether to use the hybrid rendering pass based on based on the first visibility stream and based on the set of second visibility streams. For example, that apparatus may determine whether to use the hybrid rendering pass based on the determine a set of conditions associated with one or more resolves, one or more unresolves, blending, and/or overdraw associated with rendering the target. In some other aspects, the apparatus may determine whether to use the hybrid rendering mode based on the complexity associated with the set of bins, such as a ratio of a number of relatively more complex bins to a number of relatively lesser complex bins. When the ratio is relatively higher (e.g., indicating a greater number of complex bins), then the apparatus may determine not to use the hybrid rendering pass, as the bin rendering mode may be more suitable for rendering a large number of relatively more complex bins. When the ratio is relatively lower (e.g., indicating a fewer number of complex bins), then the apparatus may determine to use the hybrid rendering pass, as the apparatus may benefit from directly rendering the larger number of lesser complexity bins into system memory.

In the context of FIGS. 1 and 3, the rendering pass configuration component 199 may determine whether to use a hybrid rendering pass (or whether to use the bin rendering mode). In the context of FIGS. 2 and 3, the GPU 202 (e.g., CP 210) may determine whether to use a hybrid rendering pass (or whether to use the bin rendering mode).

If, at 412, the apparatus determines to use the hybrid rendering pass:

At 414, the apparatus may configure each of the X bins into one of a first subset of bins or a second subset of bins based on a respective second visibility stream of the set of second visibility streams. The apparatus may configure a respective bin of the X bins into one of the first subset of bins or the second subset of bins based on at least one of overdraw associated with the respective bin, blending associated with the respective bin, a configuration for concurrent resolve operations associated with at least the respective bin, and/or a configuration for at least one clear operation concurrent with at least one resolve operation associated with rendering at least the respective bin.

In the context of FIGS. 1 and 3, the rendering pass configuration component 199 may configure each of the bins 310-315 into one of a first subset of bins or a second subset of bins based on a respective second visibility stream of the set of second visibility streams. In the context of FIGS. 2 and 3, the GPU 202 (e.g., CP 210) may configure each of the bins 310-315 into one of a first subset of bins or a second subset of bins based on a respective second visibility stream of the set of second visibility streams.

At 416, the apparatus may render each of the first subset of bins in GMEM. For example, the apparatus may render a first bin of the first subset into GMEM based on at least the visibility stream for the first bin, and the apparatus may render a second bin of the first subset of bins into GMEM based on at least the visibility stream for the second bin, and the apparatus may similarly render each of the remaining bins of the first subset into GMEM based on at least a respective visibility stream for each of the remaining bins of the first subset.

In the context of FIGS. 1 and 3, the rendering pass configuration component 199 may render each of the fourth, fifth, and sixth bins 313-315 (e.g., the first subset of bins) into GMEM (e.g., internal memory 121 or internal memory 123) based on a respective visibility stream of the visibility streams corresponding to the fourth, fifth, and sixth bins 313-315. In the context of FIGS. 2 and 3, the GPU 202 (e.g., CP 210) may render each of the fourth, fifth, and sixth bins 313-315 (e.g., the first subset of bins) into GMEM 235 based on a respective visibility stream of the visibility streams corresponding to the fourth, fifth, and sixth bins 313-315.

At 418, the apparatus may resolve the first subset of bins from GMEM to system memory. In some aspects, the apparatus may determine (e.g., identify, calculate, etc.) a respective region in a framebuffer of system memory corresponding to each of the first subset of bins stored in GMEM, and the apparatus may store or copy each of the first subset of bins from GMEM to a respective corresponding region of the framebuffer in system memory.

In the context of FIGS. 1 and 3, the rendering pass configuration component 199 may resolve each of the fourth, fifth, and sixth bins 313-315 (e.g., the first subset of bins) from GMEM (e.g., internal memory 121 or internal memory 123) to a respective corresponding region in the framebuffer 125 of the system memory 124. In the context of FIGS. 2 and 3, the GPU 202 (e.g., CP 210) may resolve each of the fourth, fifth, and sixth bins 313-315 (e.g., the first subset of bins) from GMEM 235 to system memory 240.

At 420, the apparatus may directly render the second subset of bins into system memory. For example, the apparatus may determine (e.g., identify, calculate, etc.) a respective region in a framebuffer of system memory corresponding to each of the second subset of bins, and the apparatus may directly store each of the second subset of bins to a respective corresponding region of the framebuffer in system memory. Therefore, the apparatus may refrain from rendering any of the second subset of bins to GMEM.

In the context of FIGS. 1 and 3, the rendering pass configuration component 199 may render each of the first, second, and third bins 310-312 (e.g., the second subset of bins) to a respective corresponding region in the framebuffer 125 of the system memory 124. The rendering pass configuration component 199 may refrain from rendering any of the first, second, and third bins 310-213 into GMEM (e.g., internal memory 121 or internal memory 123). In the context of FIGS. 2 and 3, the GPU 202 (e.g., CP 210) may render each of the first, second, and third bins 310-312 (e.g., the second subset of bins) to the system memory 240 without rendering any of the first, second, and third bins 310-312 to the GMEM 235.

If, at 412, the apparatus determines not to use the hybrid rendering pass (e.g., the apparatus determines to use the bin rendering mode):

At 422, the apparatus may render each of the X bins in GMEM. For example, the apparatus may render a first bin of the X bins into GMEM based on at least the visibility stream for the first bin, and the apparatus may render a second bin of the X bins into GMEM based on at least the visibility stream for the second bin, and the apparatus may similarly render each of the remaining bins of the X bins into GMEM based on at least a respective visibility stream for each of the remaining bins of the X bins.

In the context of FIGS. 1 and 3, the rendering pass configuration component 199 may render each of the bins 310-315 into GMEM (e.g., internal memory 121 or internal memory 123) based on a respective visibility stream of the visibility streams corresponding to each of the bins 310-315. In the context of FIGS. 2 and 3, the GPU 202 (e.g., CP 210) may render each of the bins 310-315 into GMEM 235 based on a respective visibility stream of the visibility streams corresponding to each of the bins 310-315.

At 424, the apparatus may resolve the X bins from GMEM to system memory. In some aspects, the apparatus may determine (e.g., identify, calculate, etc.) a respective region in a framebuffer of system memory corresponding to each of the X bins stored in GMEM, and the apparatus may store or copy each of the X bins from GMEM to a respective corresponding region of the framebuffer in system memory.

In the context of FIGS. 1 and 3, the rendering pass configuration component 199 may resolve each of the bins 310-315 from GMEM (e.g., internal memory 121 or internal memory 123) to a respective corresponding region in the framebuffer 125 of the system memory 124. In the context of FIGS. 2 and 3, the GPU 202 (e.g., CP 210) may resolve each of the bins 310-315 from GMEM 235 to system memory 240.

If, at 410, the apparatus selects the second rendering mode:

At 426, the apparatus may render the target into system memory without rendering into GMEM. The apparatus may directly render the target as a single bin into system memory. For example, the apparatus may directly store the target in the framebuffer of system memory (e.g., as a single bin). Therefore, the apparatus may refrain from rendering the target to GMEM.

In the context of FIGS. 1 and 3, the rendering mode selection component 198 may directly render the full frame 302 of the image or surface 300 into the framebuffer 125 of the system memory 124. The rendering mode selection component 198 may refrain from rendering the full frame 302 of the image or surface 300 into GMEM (e.g., internal memory 121 or internal memory 123). In the context of FIGS. 2 and 3, the GPU 202 (e.g., CP 210) may render the full frame 302 of the image or surface 300 to the system memory 240 without rendering the full frame 302 of the image or surface 300 to the GMEM 235.

Figure 5:
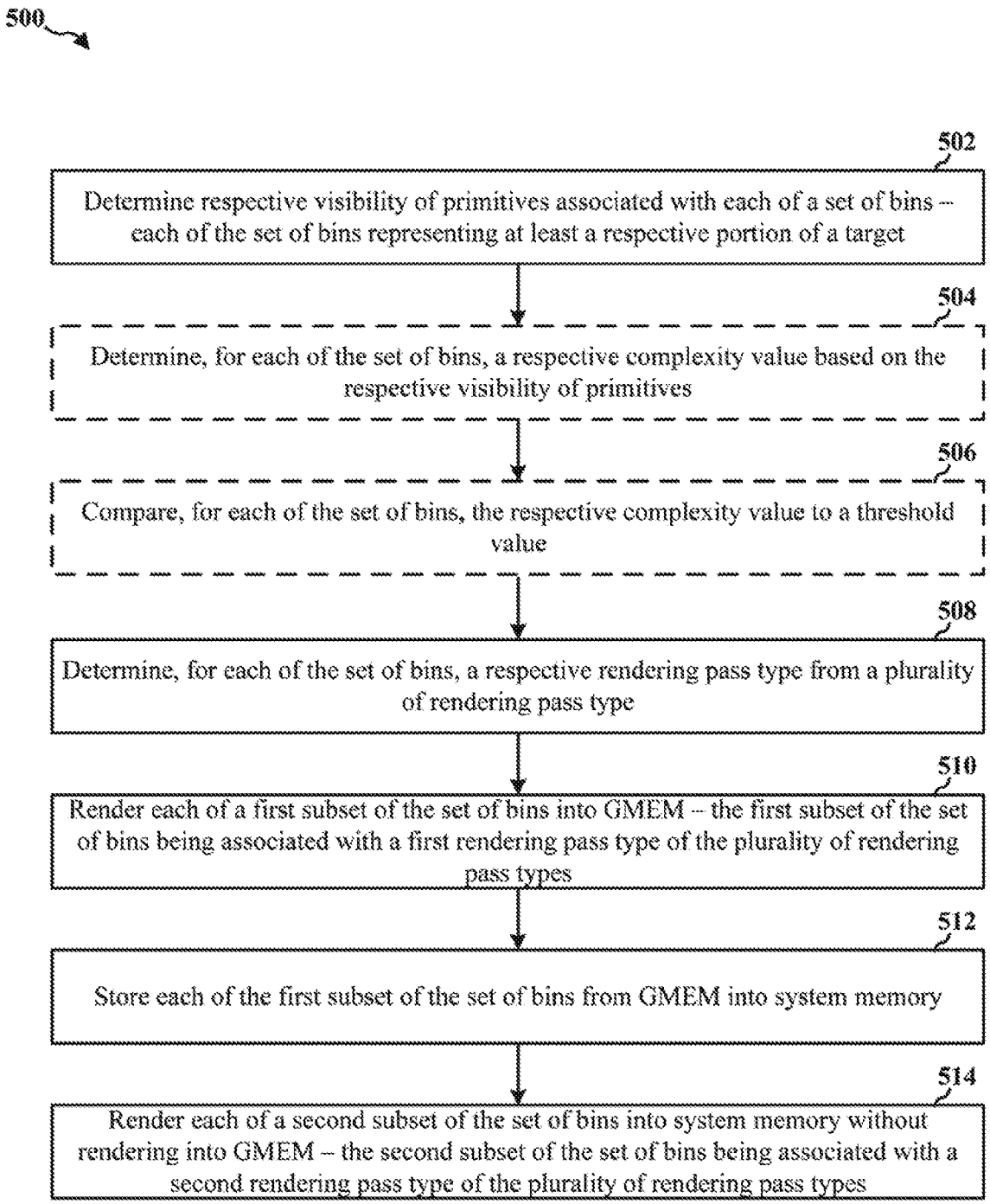
FIG. 5 illustrates another example flowchart of another example method of graphics processing in accordance with one or more aspects of the present disclosure.

FIG. 5 illustrates an example flowchart of an example method 500 in accordance with one or more aspects of the present disclosure. The method 500 may be performed by an apparatus such as a GPU, an apparatus for graphics processing, and/or one or more other processing units. In the context of FIGS. 1-3, for example, the method 500 may be performed by a system 100 and/or system 200 for rendering a full frame 302 of an image or surface 300. According to different aspects of the method 500, one or more of the illustrated blocks may be omitted, transposed, and/or contemporaneously performed.

At 502, the apparatus may determine respective visibility of primitives associated with each of a set of bins. Each of the set of bins may represent at least a respective portion of a target (e.g., image, frame, scene, etc.)—that is, the target may be divided into the set of bins. In some aspects, the apparatus may determine a respective visibility stream corresponding to each of the set of bins—for example, a respective visibility stream corresponding to a respective bin may include information indicating the respective visibility of primitives associated with the respective bin. In some aspects, each of the visibility streams may be obtained based on a respective visibility pass on a respective bin of the set of bins. A respective visibility stream associated each of the set of bins into which the target is divided may be constructed where visible primitives (e.g., triangles) and/or draw calls can be identified. For example, for each of the set of bins, the apparatus (e.g., a VFD) may determine respective position data associated with a respective set of vertices (e.g., vertices of one or more primitives, such as primitives visible in a respective bin). The apparatus (e.g., a VS) may process the respective vertex position data of each of the bins, e.g., as obtained from VFD. The apparatus may process each of the set of bins through a stream compressor (e.g., a VSC). The apparatus (e.g., the VSC) may use source pixels associated with a rasterized primitives in order to generate each of the visibility streams corresponding to a respective bin of the set of bins.

In some other aspects, the apparatus may determine respective visibility of primitives associated with each of the set of bins by processing primitives of the target, which may be input through a command stream. For example, the apparatus may divide the target into the set of bins so that each bin represents a different section (e.g., non-overlapping section) of the target, and then the apparatus may sort primitives (e.g., input primitives) into one of the bins, e.g., based on the visibility of a primitive within one of the bins. For example, primitives may be processed through a VS, and primitives may be sorted into bins based on output of the VS processing.

In the context of FIGS. 1 and 3, the rendering mode selection component 198 may determine respective visibility of primitives associated with each of the set of bins 310-315 into which the full frame 302 of the image or surface 300 is divided. For example, the rendering mode selection component 198 may determine a respective visibility stream corresponding to each of the set of bins 310-315 into which the full frame 302 of the image or surface 300 is divided, e.g., based on a set of visibility passes for set of bins 310-315. In the context of FIGS. 2 and 3, the CP 210 may determine respective visibility of primitives associated with each of the set of bins 310-315 into which the full frame 302 of the image or surface 300 is divided. In some aspects, the CP 210 may determine a respective visibility stream corresponding to each of the set of bins 310-315 into which the full frame 302 of the image or surface 300 is divided, e.g., based on a set of visibility passes for the set of bins 310-315. For example, each of the bins 310-315 and/or respective draw calls associated therewith may be processed through one or more of the VFD 220, VS 221, VC 222, TSE 223, RAS 224, and/or ZPE 225, e.g., for a respective visibility pass associated with one of the bins 310-315, which may facilitate generation of each of the set of visibility streams by the VSC 226.

At 504, the apparatus may determine, for each of the set of bins, a respective complexity value based on a respective visibility of primitives. For example, the apparatus may determine, for each of the set of bins, a respective complexity value based on a respective visibility stream corresponding to a respective bin. In some aspects, the apparatus may determine a respective complexity value for a bin of the set of bins based on at least one of overdraw associated with the respective bin, blending associated with the respective bin, and/or a number of object (e.g., primitives, triangles, etc.) of the target at least partially represented in the bin. For example, the apparatus may determine at least one of an amount of overdraw associated with the bin, an amount of blending associated with the bin, and/or a number of objects at least partially within the bin.

The apparatus may then determine (e.g., calculate, compute, adjust, etc.) the respective complexity value for the bin based on the at least one of an amount of overdraw associated with the bin, an amount of blending associated with the bin, and/or a number of objects at least partially within the bin. For example, the apparatus may increase the respective complexity value based on a relatively higher amount of overdraw, a relatively higher amount of blending, and/or a relatively greater number of objects associated with the bin. However, the apparatus may decrease the respective complexity value based on a relatively lower amount of overdraw, a relatively lower amount of blending, and/or a relatively fewer number of objects associated with the bin.

In some other aspects, the apparatus may determine a respective complexity value for a bin of the set of bins based on at least one configuration associated with concurrent resolves and/or concurrent unresolves and/or concurrent clear-on-store operations. For example, the apparatus may determine whether at least one configuration of the apparatus enables concurrent resolves and/or concurrent unresolves and/or concurrent clear-on-store operations, and the apparatus may decrease the complexity value based on such enablement. However, if the apparatus determines at least one configuration of the apparatus disables concurrent resolves and/or concurrent unresolves and/or concurrent clear-on-store operations, then apparatus may decrease the complexity value based on such disablement.

In the context of FIGS. 1 and 3, the rendering pass configuration component 199 may determine, for each of the bins 310-315, a respective complexity value based on respective visibility of primitives associated with a respective one of the bins 310-315. For example, the rendering pass configuration component 199 may determine, for each of the bins 310-315, a respective complexity value based on a respective visibility stream corresponding to a respective one of the bins 310-315. In the context of FIGS. 2 and 3, the GPU 202 (e.g., CP 210) may determine, for each of the bins 310-315, a respective complexity value based on respective visibility of primitives associated with a respective one of the bins 310-315. For example, the GPU 202 (e.g., CP 210) may determine, for each of the bins 310-315, a respective complexity value based on a respective visibility stream associated with a respective one of the bins 310-315.

At 506, the apparatus may compare, for each of the set of bins, the respective complexity value to a threshold value. For example, the apparatus may determine a threshold value to which a respective complexity value is to be compared in order to determine whether a respective one of the bins should be rendered into GMEM or directly rendered into system memory. The threshold value may be preconfigured, or the apparatus may determine (e.g., calculate, compute, adjust) the threshold value based on the set of bins and/or based on configuration(s) of one or more components of the apparatus, such as a capability for concurrent resolve(s), concurrent unresolved(s), and/or concurrent clear-on-store operations. The apparatus may then determine whether the respective complexity value satisfies (e.g., is greater than) the threshold value or fails to satisfy (e.g., is less than) the threshold value.

In the context of FIGS. 1 and 3, the rendering pass configuration component 199 may compare, for each of the bins 310-315, the respective complexity value to the bin complexity threshold. In the context of FIGS. 2 and 3, the GPU 202 (e.g., CP 210) may compare, for each of the bins 310-315, the respective complexity value to the bin complexity threshold.

At 508, the apparatus may determine, for each of the set of bins, a respective rendering pass type from a plurality of rendering pass types based on respective visibility of primitives associated with a respective one of the set of bins. In some aspects, the apparatus may determine, for each of the set of bins, a respective rendering pass type from a plurality of rendering pass types based on a respective visibility stream corresponding to a respective one of the set of bins. The plurality of rendering pass types may include at least a first rendering pass type associated with rendering into GMEM and a second rendering pass type associated with refraining from rendering into GMEM (e.g., associated with directly rendering into system memory). The apparatus may determine a respective rendering pass type for each of the set of bins based on a respective visibility of primitives and/or based on a respective corresponding visibility stream.

For example, the apparatus may determine a respective complexity value for each of the bins at least based on a respective visibility of primitives associated with a respective one of the set of bins. For example, the apparatus may determine a respective complexity value for each of the bins at least based on a corresponding visibility stream associated with a respective one of the set of bins. The apparatus may then determine a respective rendering pass type based on the comparison of the respective complexity value to the threshold value and, as the respective complexity value may be based on the respective visibility of primitives and/or respective corresponding visibility stream, the respective rendering pass type may therefore be determined based on the respective visibility of primitives and/or respective corresponding visibility stream.

In some aspects, the apparatus may determine, for each of the set of bins, whether a respective complexity value satisfies the threshold value based on the comparison. In response to determining that a respective complexity value satisfies the threshold value, the apparatus may include a bin in a first subset of bins associated with the first rendering pass type that includes rendering into GMEM. In response to determining that a respective complexity value fails to satisfy the threshold value, the apparatus may include a bin in a second subset of bins associated with the second rendering pass type that excludes rendering into GMEM.

In the context of FIGS. 1 and 3, the rendering pass configuration component 199 may determine, for each of the bins 310-315, a respective rendering pass type from a plurality of rendering pass types based on a respective visibility of primitives associated with a respective one of the bins 310-315. For example, the rendering pass configuration component 199 may determine, for each of the bins 310-315, a respective rendering pass type from a plurality of rendering pass types based on a respective visibility stream associated with a respective one of the bins 310-315. The plurality of rendering pass types may include a first rendering pass type associated with rendering into GMEM (e.g., the internal memory 121 and/or the internal memory 123) and a second rendering pass type associated with refraining from rendering into GMEM. In the context of FIGS. 2 and 3, the GPU 202 (e.g., CP 210) may determine, for each of the bins 310-315, a respective rendering pass type from a plurality of rendering pass types that includes a first rendering pass type associated with rendering into GMEM 235 and a second rendering pass type associated with refraining from rendering into GMEM 235. For example, the GPU 202 (e.g., CP 210) may determine, for each of the bins 310-315, the respective rendering pass type based on a respective visibility of primitives associated with a respective one of the bins 310-315 and/or based on a respective visibility stream associated with a respective one of the bins 310-315.

At 510, the apparatus may render each of the first subset of bins in GMEM, each of the first subset of bins being associated with the first rendering pass type. For example, the apparatus may render a first bin of the first subset into GMEM based on at least the respective visibility of primitives associated with the first bin (e.g., a subset of primitives visible in the first bin, the subset being from the set of primitives visible in the target) and/or based on the visibility stream for the first bin. The apparatus may also render a second bin of the first subset of bins into GMEM based on at least the respective visibility of primitives associated with the second bin and/or the visibility stream for the second bin. Similarly, the apparatus may render each of the remaining bins of the first subset into GMEM based on at least a respective visibility of primitives associated with each of the remaining bins and/or a respective visibility stream for each of the remaining bins of the first subset.

In the context of FIGS. 1 and 3, the rendering pass configuration component 199 may render each of the fourth, fifth, and sixth bins 313-315 (e.g., the first subset of bins) into GMEM (e.g., internal memory 121 or internal memory 123) based on respective visibility of primitives 322-324 associated with the fourth, fifth, and sixth bins 313-315. For example, the rendering pass configuration component 199 may render each of the fourth, fifth, and sixth bins 313-315 into GMEM based on a respective visibility stream of the visibility streams corresponding to the fourth, fifth, and sixth bins 313-315. In the context of FIGS. 2 and 3, the GPU 202 (e.g., CP 210) may render each of the fourth, fifth, and sixth bins 313-315 (e.g., the first subset of bins) into GMEM 235 based on respective visibility of primitives 322-324 associated with the fourth, fifth, and sixth bins 313-315. For example, the GPU 202 (e.g., CP 210) may render each of the fourth, fifth, and sixth bins 313-315 (e.g., the first subset of bins) into GMEM 235 based on a respective visibility stream of the visibility streams corresponding to the fourth, fifth, and sixth bins 313-315.

At 512, the apparatus may store each of the first subset of bins from GMEM to system memory. In some aspects, the apparatus may determine (e.g., identify, calculate, etc.) a respective region in a framebuffer of system memory corresponding to each of the first subset of bins stored in GMEM, and the apparatus may store or copy each of the first subset of bins from GMEM to a respective corresponding region of the framebuffer in system memory.

In the context of FIGS. 1 and 3, the rendering pass configuration component 199 may resolve (e.g., store, copy, etc.) each of the fourth, fifth, and sixth bins 313-315 (e.g., the first subset of bins) from GMEM (e.g., internal memory 121 or internal memory 123) to a respective corresponding region in the framebuffer 125 of the system memory 124. In the context of FIGS. 2 and 3, the GPU 202 (e.g., CP 210) may store (e.g., resolve, copy, etc.) each of the fourth, fifth, and sixth bins 313-315 (e.g., the first subset of bins) from GMEM 235 to system memory 240.

At 514, the apparatus may render each of the second subset of bins into system memory without rendering into GMEM, each of the second subset of bins being associated with the second rendering pass type. For example, the apparatus may determine (e.g., identify, calculate, etc.) a respective region in a framebuffer of system memory corresponding to each of the second subset of bins, and the apparatus may directly store each of the second subset of bins to a respective corresponding region of the framebuffer in system memory. Therefore, the apparatus may directly render the second subset of bins in system memory, and further, may refrain from rendering any of the second subset of bins to GMEM.

In some aspects, the apparatus may render each of the second subset of bins into system memory using a bin mask that is based on a depth buffer (e.g., LRZ buffer) associated with the respective bin. The bin mask may be configured for early Z rejection when rendering each of the second subset of bins.

In some aspects, the first subset of bins may be rendered before the second subset of bins is rendered. For example, the apparatus may render each of the first subset of bins into GMEM, and then, the apparatus may resolve each of the first subset of bins from GMEM to system memory. After the first subset of bins is resolved, the apparatus may render the second subset of bins directly into system memory. The apparatus may directly render the second subset of bins into system memory in a single rendering pass.

In the context of FIGS. 1 and 3, the rendering pass configuration component 199 may render each of the first, second, and third bins 310-312 (e.g., the second subset of bins) to a respective corresponding region in the framebuffer 125 of the system memory 124. The rendering pass configuration component 199 may refrain from rendering any of the first, second, and third bins 310-213 into GMEM (e.g., internal memory 121 or internal memory 123). In the context of FIGS. 2 and 3, the GPU 202 (e.g., CP 210) may render each of the first, second, and third bins 310-312 (e.g., the second subset of bins) to the system memory 240 without rendering any of the first, second, and third bins 310-312 to the GMEM 235.

The subject matter described herein can be implemented to realize one or more benefits or advantages. For instance, the described graphics processing techniques can be used by a GPU, a CPU, or some other processor that can perform graphics processing to implement the rendering techniques described herein. This can also be accomplished at a low cost compared to other graphics processing techniques. Moreover, the graphics processing techniques herein can improve or speed up data processing or execution. Further, the graphics processing techniques herein can improve resource or data utilization and/or resource efficiency. Additionally, aspects of the present disclosure can utilize the rendering mode selection techniques described herein to reduce time spent and/or money consumed during an incremental stream or command stream.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

Example 1 be an apparatus for graphics processing that is configured to: determine a respective visibility of primitives associated with each of a set of bins, each of the set of bins representing at least a respective portion of a target; determine, for each of the set of bins, a respective rendering pass type from a plurality of rendering pass types based on the respective visibility or primitives, the plurality of rendering pass types comprising a first rendering pass type associated with rendering a bin into GMEM and a second rendering pass type associated with refraining from rendering a bin into the GMEM; and render the target based on the respective rendering pass type determined for each of the set of bins.

Example 2 may include the apparatus of Example 1, the apparatus being further configured to: render each of a first subset of the set of bins into the GMEM when the first rendering pass type is determined as the respective rendering pass type for each of the first subset of the set of bins; and store data corresponding each of the first subset of the set of bins from the GMEM to system memory.

Example 3 may include the apparatus of Example 2, the apparatus being further configured to: render each of a second subset of the set of bins into the system memory without rendering into the GMEM when the second rendering pass type is determined as the respective rendering pass type for each of the second subset of the set of bins.

Example 4 may include the apparatus of Example 3, and the first subset of the set of bins is rendered before the second subset of the set of bins is rendered.

Example 5 may include the apparatus of Example 3 or Example 4, and each of the first subset of bins is rendered into the GMEM before each of the first subset of bins is stored from the GMEM into the system memory, and wherein the second subset of the set of bins is rendered into the system memory in one rendering pass.

Example 6 may include the apparatus of any of Examples 3-5, and, for each of the second subset of the set of bins, a respective bin is rendered using a bin mask that is based on a depth buffer associated with the respective bin.

Example 7 may include the apparatus of any of Examples 1-6, the apparatus being further configured to: determine, for each of the set of bins, a respective complexity value based on the respective visibility of primitives, and the respective rendering pass type for each of the set of bins is determined based on the respective complexity value.

Example 8 may include the apparatus of Example 7, and the respective complexity value is determined for a respective bin of the set of bins based on at least one of overdraw associated with the respective bin, blending associated with the respective bin, or a number of objects of the target at least partially represented in the respective bin.

Example 9 may include the apparatus of Example 7 or Example 8, the apparatus being further configured to: compare, for each of the set of bins, the respective complexity value to a threshold value, and the respective rendering pass type for each of the set of bins is determined based on the comparison of the respective complexity value to the threshold value.

Example 10 be an apparatus for graphics processing that is configured to: determine a first visibility stream corresponding to a target based on a first visibility pass for the target; determine a set of second visibility streams respectively corresponding to a set of bins based on a set of second visibility passes for the set of bins, the target being divided into the set of bins; select one of a first rendering mode or a second rendering mode for the target based on the first visibility stream and based on the set of second visibility streams, the first rendering mode including rendering each of the set of bins and the second rendering mode including directly rendering the target; and render the target based on the selected one of the first rendering mode or the second rendering mode.

Example 11 may include the apparatus of Example 10, and when the first rendering mode is selected, the rendering the target includes: configuring each of the set of bins into one of a first subset of bins or a second subset of bins based on a respective second visibility stream of the set of second visibility streams; rendering each of the first subset of bins in the GMEM to store a first portion of the target in the GMEM; storing the first portion of the target in system memory from the GMEM; and rendering each of the second subset of the set of bins in the system memory without rendering into the GMEM to store a remaining portion of the target in the system memory.

Example 12 may include the apparatus of Example 11, and a respective bin of the set of bins is configured into one of the first subset of bins or the second subset of bins further based on at least one of overdraw associated with the respective bin, blending associated with the respective bin, a configuration for concurrent resolve operations associated with at least the respective bin, or a configuration for at least one clear operation concurrent with at least one resolve operation associated with rendering at least the respective bin.

Example 13 may include the apparatus of Example 10, and when the first rendering mode is selected, the rendering the target includes: rendering each of the set of bins in GMEM to store the target in the GMEM; and storing the target in system memory from the GMEM.

Example 14 may include the apparatus of any of Examples 10-13, and when the second rendering mode is selected, the rendering the target includes: rendering the target in system memory, the target being directly rendered in the system memory without being rendered in GMEM.

Example 15 may include the apparatus of any of Examples 10-14, the apparatus being further configured to: determine LRZ information associated with an LRZ buffer for the target, and the selection the one of the first rendering mode or the second rendering mode is further based on the LRZ information.

Example 16 may include the apparatus of Example 15, and the selection of the one of the first rendering mode or the second rendering mode is further based on a ratio of a number of visible pixels to a total number of pixels associated with rendering of the target, and the number of visibility pixels is based on the LRZ information.

Example 17 may include the apparatus of any of Examples 10-16, the apparatus being further configured to: determine, based on the first visibility stream and based on the set of second visibility streams, a set of conditions associated with one or more resolves, one or more unresolves, blending, or overdraw associated with rendering the target, and the selection of the one of the first rendering mode or the second rendering mode is further based on the determined set of conditions.

Example 18 may include the apparatus of any of Examples 10-17, and the selection of the one of the first rendering mode or the second rendering mode is further based on at least one configuration for concurrent resolves or concurrent unresolves associated with the rendering of the target.

Example 19 may include the apparatus of any of Examples 10-18, and the selection of the one of the first rendering mode or the second rendering mode is further based on a configuration for at least one clear operation concurrent with at least one resolve operation associated with the rendering of the target.

What is claimed is:

1. A method of graphics processing, comprising:
    determining a respective visibility of primitives associated with each of a set of bins, each of the set of bins representing at least a respective portion of a target;
    determining, for each of the set of bins, a respective rendering pass type from a plurality of rendering pass types based on the respective visibility of primitives, the plurality of rendering pass types comprising a first rendering pass type associated with rendering a bin into graphics memory (GMEM) and a second rendering pass type associated with refraining from rendering a bin into the GMEM; and
    rendering the target based on the respective rendering pass type determined for each of the set of bins.

2. The method of claim 1, further comprising:
    rendering each of a first subset of the set of bins into the GMEM when the first rendering pass type is determined as the respective rendering pass type for each of the first subset of the set of bins; and
    storing data corresponding each of the first subset of the set of bins from the GMEM to system memory.

3. The method of claim 2, further comprising:
    rendering each of a second subset of the set of bins into the system memory without rendering into the GMEM when the second rendering pass type is determined as the respective rendering pass type for each of the second subset of the set of bins.

4. The method of claim 3, wherein the first subset of the set of bins is rendered before the second subset of the set of bins is rendered.

5. The method of claim 3, wherein each of the first subset of bins is rendered into the GMEM before each of the first subset of bins is stored from the GMEM into the system memory, and wherein the second subset of the set of bins is rendered into the system memory in one rendering pass.

6. The method of claim 3, wherein, for each of the second subset of the set of bins, a respective bin is rendered using a bin mask that is based on a depth buffer associated with the respective bin.

7. The method of claim 1, further comprising:
    determining, for each of the set of bins, a respective complexity value based on the respective visibility of primitives,
    wherein the respective rendering pass type for each of the set of bins is determined based on the respective complexity value.

8. The method of claim 7, wherein the respective complexity value is determined for a respective bin of the set of bins based on at least one of overdraw associated with the respective bin, blending associated with the respective bin, or a number of objects of the target at least partially represented in the respective bin.

9. The method of claim 7, further comprising:
    comparing, for each of the set of bins, the respective complexity value to a threshold value, and
    wherein the respective rendering pass type for each of the set of bins is determined based on the comparing of the respective complexity value to the threshold value.

10. An apparatus for graphics processing, comprising:
    a memory; and
    at least one processor coupled to the memory and configured to:
        determine a respective visibility of primitives associated with each of a set of bins, each of the set of bins representing at least a respective portion of a target;
        determine, for each of the set of bins, a respective rendering pass type from a plurality of rendering pass types based on the respective visibility of primitives, the plurality of rendering pass types comprising a first rendering pass type associated with rendering a bin into graphics memory (GMEM) and a second rendering pass type associated with refraining from rendering a bin into the GMEM; and
        render the target based on the respective rendering pass type determined for each of the set of bins.

11. The apparatus of claim 10, wherein the at least one processor is further configured to:
    render each of a first subset of the set of bins into the GMEM when the first rendering pass type is determined as the respective rendering pass type for each of the first subset of the set of bins; and
    store data corresponding each of the first subset of the set of bins from the GMEM to system memory.

12. The apparatus of claim 11, wherein the at least one processor is further configured to:
    render each of a second subset of the set of bins into the system memory without rendering into the GMEM when the second rendering pass type is determined as the respective rendering pass type for each of the second subset of the set of bins.

13. The apparatus of claim 12, wherein the first subset of the set of bins is rendered before the second subset of the set of bins is rendered.

14. The apparatus of claim 12, wherein each of the first subset of bins is rendered into the GMEM before each of the first subset of bins is stored from the GMEM into the system memory, and wherein the second subset of the set of bins is rendered into the system memory in one rendering pass.

15. The apparatus of claim 12, wherein, for each of the second subset of the set of bins, a respective bin is rendered using a bin mask that is based on a depth buffer associated with the respective bin.

16. The apparatus of claim 10, wherein the at least one processor is further configured to:
    determine, for each of the set of bins, a respective complexity value based on the respective visibility of primitives,
    wherein the respective rendering pass type for each of the set of bins is determined based on the respective complexity value.

17. The apparatus of claim 16, wherein the respective complexity value is determined for a respective bin of the set of bins based on at least one of overdraw associated with the respective bin, blending associated with the respective bin, or a number of objects of the target at least partially represented in the respective bin.

18. The apparatus of claim 16, wherein the at least one processor is further configured to:
    compare, for each of the set of bins, the respective complexity value to a threshold value, and wherein the respective rendering pass type for each of the set of bins is determined based on the comparison of the respective complexity value to the threshold value.

19. An apparatus for graphics processing, comprising:
means for determining a respective visibility of primitives associated with each of a set of bins, each of the set of bins representing at least a respective portion of a target;
means for determining, for each of the set of bins, a respective rendering pass type from a plurality of rendering pass types based on the respective visibility of primitives, the plurality of rendering pass types comprising a first rendering pass type associated with rendering a bin into graphics memory (GMEM) and a second rendering pass type associated with refraining from rendering a bin into the GMEM; and
means for rendering the target based on the respective rendering pass type determined for each of the set of bins.

20. The apparatus of claim 19, further comprising:
means for rendering each of a first subset of the set of bins into the GMEM when the first rendering pass type is determined as the respective rendering pass type for each of the first subset of the set of bins; and
means for storing data corresponding each of the first subset of the set of bins from the GMEM to system memory.

21. The apparatus of claim 20, further comprising:
means for rendering each of a second subset of the set of bins into the system memory without rendering into the GMEM when the second rendering pass type is determined as the respective rendering pass type for each of the second subset of the set of bins.

22. The apparatus of claim 21, wherein the first subset of the set of bins is rendered before the second subset of the set of bins is rendered.

23. The apparatus of claim 21, wherein each of the first subset of bins is rendered into the GMEM before each of the first subset of bins is stored from the GMEM into the system memory, and wherein the second subset of the set of bins is rendered into the system memory in one rendering pass.

24. The apparatus of claim 21, wherein, for each of the second subset of the set of bins, a respective bin is rendered using a bin mask that is based on a depth buffer associated with the respective bin.

25. The apparatus of claim 19, further comprising:
means for determining, for each of the set of bins, a respective complexity value based on the respective visibility of primitives,
wherein the respective rendering pass type for each of the set of bins is determined based on the respective complexity value.

26. The apparatus of claim 25, wherein the respective complexity value is determined for a respective bin of the set of bins based on at least one of overdraw associated with the respective bin, blending associated with the respective bin, or a number of objects of the target at least partially represented in the respective bin.

27. The apparatus of claim 25, further comprising:
means for comparing, for each of the set of bins, the respective complexity value to a threshold value, and
wherein the respective rendering pass type for each of the set of bins is determined based on comparing the respective complexity value to the threshold value.

28. A non-transitory computer-readable medium storing computer-executable code for graphics processing, the code when executed by a processor cause the processor to:
determine a respective visibility of primitives associated with each of a set of bins, each of the set of bins representing at least a respective portion of a target;
determine, for each of the set of bins, a respective rendering pass type from a plurality of rendering pass types based on the respective visibility of primitives, the plurality of rendering pass types comprising a first rendering pass type associated with rendering a bin into graphics memory (GMEM) and a second rendering pass type associated with refraining from rendering a bin into the GMEM; and
render the target based on the respective rendering pass type determined for each of the set of bins.

29. The non-transitory computer-readable medium of claim 28, further comprising code to cause the processor to:
render each of a first subset of the set of bins into the GMEM when the first rendering pass type is determined as the respective rendering pass type for each of the first subset of the set of bins; and
store data corresponding each of the first subset of the set of bins from the GMEM to system memory.

30. The non-transitory computer-readable medium of claim 28, further comprising code to cause the processor to:
render each of a second subset of the set of bins into the system memory without rendering into the GMEM when the second rendering pass type is determined as the respective rendering pass type for each of the second subset of the set of bins.

* * * * *